(12) United States Patent
Morishige et al.

(10) Patent No.: US 9,618,035 B2
(45) Date of Patent: *Apr. 11, 2017

(54) SYNTHETIC RESIN-MADE SLIDING BEARING

(71) Applicant: OILES CORPORATION, Tokyo (JP)

(72) Inventors: Kouici Morishige, Fujisawa (JP);
Takashi Horiguchi, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 19 days.

This patent is subject to a terminal disclaimer.

(21) Appl. No.: 14/747,024

(22) Filed: Jun. 23, 2015

(65) Prior Publication Data

US 2015/0316099 A1 Nov. 5, 2015

Related U.S. Application Data

(63) Continuation of application No. 14/124,857, filed as application No. PCT/JP2012/003361 on May 23, 2012, now Pat. No. 9,091,297.

(30) Foreign Application Priority Data

Jun. 9, 2011 (JP) ................. 2011-129325

(51) Int. Cl.
*F16C 17/04* (2006.01)
*F16C 33/74* (2006.01)
(Continued)

(52) U.S. Cl.
CPC .............. *F16C 17/04* (2013.01); *F16C 17/08* (2013.01); *F16C 17/107* (2013.01); *F16C 33/20* (2013.01);
(Continued)

(58) Field of Classification Search
CPC ........ F16C 17/04; F16C 17/08; F16C 17/107; F16C 33/74; F16C 33/20; F16C 33/201;
(Continued)

(56) References Cited

U.S. PATENT DOCUMENTS 8,708,568 B2   4/2014 Morishige et al.
9,091,297 B2 * 7/2015 Morishige ............... F16C 33/74
(Continued)

FOREIGN PATENT DOCUMENTS

EP    1 555 144 A2   7/2005
JP    4-8918         1/1992
(Continued)

OTHER PUBLICATIONS

International Search Report for PCT/IB2012/003361, mailed Jul. 24, 2012.

*Primary Examiner* — James Pilkington
(74) *Attorney, Agent, or Firm* — Nixon & Vanderhye P.C.

(57) ABSTRACT

A sliding bearing includes: an upper casing; a synthetic resin-made lower casing which is superposed on the upper casing so as to be rotatable about an axis in a circumferential direction relative to the upper casing; a synthetic resin-made sliding bearing piece disposed in an annular space between the upper casing and the lower casing; and a synthetic resin-made seal member for sealing respective other annular end portions, communicating with the outside, of a gap on an inner peripheral side and a gap on an outer peripheral side in a radial direction between the upper casing and the lower casing, the gap and the gap respectively communicating with the annular space at their one annular end portions.

4 Claims, 21 Drawing Sheets

(51) Int. Cl.
  *F16C 17/10* (2006.01)
  *F16C 33/20* (2006.01)
  *F16C 17/08* (2006.01)
  *F16C 33/10* (2006.01)
(52) U.S. Cl.
  CPC .......... *F16C 33/74* (2013.01); *F16C 33/1065* (2013.01); *F16C 2326/05* (2013.01); *F16C 2361/53* (2013.01)
(58) Field of Classification Search
  CPC .............. F16C 33/1065; F16C 2361/53; F16C 2326/05; B60G 15/068; B60G 2204/418
  See application file for complete search history.

(56)     References Cited

U.S. PATENT DOCUMENTS

| | | |
|---|---|---|
| 2010/0040317 A1 | 2/2010 | Kallem |
| 2011/0019951 A1 | 1/2011 | Kaneko |
| 2013/0142462 A1 | 6/2013 | Morishige et al. |
| 2014/0112605 A1 | 4/2014 | Morishige |

FOREIGN PATENT DOCUMENTS

| | | |
|---|---|---|
| JP | 04-008918 | 1/1992 |
| JP | 2001-027227 | 1/2001 |
| JP | 2001-027228 | 1/2001 |
| JP | 2001-27229 | 1/2001 |
| JP | 2001-027229 | 1/2001 |
| JP | 2009-250278 | 10/2009 |
| WO | WO 2010/012766 A1 | 2/2010 |
| WO | WO2012/017591 * | 2/2012 |

* cited by examiner

SYNTHETIC RESIN-MADE SLIDING BEARING

CROSS REFERENCE TO RELATED APPLICATION

This application is a divisional of U.S. application Ser. No. 14/124,857 filed on Dec. 9, 2012, which is a U.S. national phase of International Application No. PCT/JP2012/003361, filed 23 May 2012 which designated the U.S. and claims priority to JP Application 2011-129325, filed 9 Jun. 2011, the entire contents of each of which are hereby incorporated by reference.

TECHNICAL FIELD

The present invention relates to a thrust sliding bearing, and more particularly to a synthetic resin-made sliding bearing which is suitably incorporated as a sliding bearing of a strut-type suspension (Macpherson type) in a four-wheeled motor vehicle.

BACKGROUND ART

In general, a strut-type suspension is mainly used for a front wheel of a four-wheeled motor vehicle, and is so arranged that a strut assembly incorporating a hydraulic shock absorber in an outer cylinder integrated with a main shaft is combined with a suspension coil spring. Among such suspensions, there is a type in which when the strut assembly rotates together with the coil spring in the steering operation, the piston rod of the strut assembly rotates, and a type in which the piston rod does not rotate. In either type, there are cases where, instead of a rolling ball bearing, a synthetic resin-made sliding bearing is used between a mounting member on the vehicle body and an upper spring seat of the coil spring, so as to allow smooth rotation of the strut assembly.

PRIOR ART DOCUMENTS

Patent Documents

[Patent Document 1] JP-A-2001-27227
[Patent Document 2] JP-A-2001-27228
[Patent Document 3] JP-A-2001-27229

Concerning a synthetic resin-made sliding bearing which includes a synthetic resin-made lower casing, a synthetic resin-made upper casing superposed on this lower casing, and a synthetic resin-made sliding bearing means disposed in a space between the upper and lower casings, in Patent Document 1, a synthetic resin-made sliding bearing is proposed which is comprised of an outer resiliently sealing means disposed on an outer peripheral side between the upper and lower casings and an inner resiliently sealing means disposed on an inner peripheral side between the upper and lower casings; in Patent Document 2, a synthetic resin-made sliding bearing is proposed which is comprised of an outer sealing means disposed on an outer peripheral side in the space between the upper and lower casings and an inner labyrinth sealing means disposed on an inner peripheral side in the space between the upper and lower casings; and in Patent Document 3, a synthetic resin-made sliding bearing is proposed which is comprised of a resiliently sealing means which is disposed in such a manner as to cover an outer surface of the lower casing and which seals outer and inner annular openings of a space between the upper and lower casings at both annular end portions.

SUMMARY OF THE INVENTION

Problems that the Invention is to Solve

Incidentally, with the sliding bearing of Patent Document 1, in order to seal respective gaps on the inner and outer peripheral sides between the upper and lower casings, the inner resiliently sealing means and outer resiliently sealing means which are separate members are disposed in the respective gaps, so that time is required in the assembly operation and therefore there is a possibility of causing a rise in the cleaning cost. With the sliding bearing of Patent Document 2, since the labyrinth sealing means is used to seal the inner gap between the upper and lower casings, the characteristic of preventing the ingress of dust, muddy water, and the like from the gap on the inner peripheral side is slightly inferior in comparison with the resiliently sealing means. With the sliding bearing of Patent Document 3, since the resiliently sealing means for sealing the respective gaps on the inner and outer peripheral sides between the upper and lower casings is disposed on an outer surface of the lower casing, there is a possibility of such as the coming off of the resiliently sealing means from the lower casing when used over extended periods of time. None of these sliding bearings are yet satisfactory concerning the manufacturing cost, durability, and sealability.

The present invention has been devised in view of the above-described aspects, and its object is to provide a synthetic resin-made sliding bearing which is capable of reliably preventing the ingress of dust and the like onto sliding surfaces without causing a decline in the sliding characteristics due to the ingress of the dust and the like, and which makes it possible to reduce time in the assembly operation and does not easily come off due to vibrations and the like, thereby making it possible to improve the manufacturing cost, durability, and sealability and maintain smooth steering during the steering operation over extended periods of time.

Means for Solving the Problems

A synthetic resin-made sliding bearing in accordance with the present invention comprises: a synthetic resin-made upper casing integrally including an annular upper casing base portion having an annular lower surface in an axial direction, an inner peripheral-side cylindrical suspended portion suspended from a radially inner peripheral end portion of the annular lower surface of the upper casing base portion, and an outer peripheral-side cylindrical suspended portion suspended from a radially outer peripheral end portion of the annular lower surface of the upper casing base portion; a synthetic resin-made lower casing integrally including an annular lower casing base portion having an annular upper surface in the axial direction and superposed on the upper casing so as to be rotatable about an axis relative to the upper casing and an annular protrusion protruding from the annular upper surface of the lower casing base portion toward the annular lower surface of the upper casing base portion; a synthetic resin-made sliding bearing piece disposed in an annular space between the annular lower surface of the upper casing base portion and the annular upper surface of the annular protrusion of the lower casing base portion and in an annular space between the outer peripheral surface of the inner peripheral-side cylindrical suspended portion and the cylindrical inner peripheral surface of the annular protrusion, so as to be brought at an axial annular upper surface and a radial cylindrical inner peripheral surface thereof into slidable contact with the annular lower surface of the upper casing base portion and a radial outer peripheral surface of the inner peripheral-side cylindrical suspended portion, while being brought at an axial annular lower surface and a radial cylindrical outer peripheral surface thereof into contact with an axial annular upper surface and a radial cylindrical inner peripheral surface of the annular protrusion; and a synthetic resin-made seal member having on a radially inner peripheral side thereof a flexible inner peripheral-side annular seal portion which is brought into contact with a radially inner peripheral surface of the inner peripheral-side cylindrical suspended portion of the upper casing so as to seal a gap between the inner peripheral-side cylindrical suspended portion of the upper casing and the annular protrusion of the lower casing base portion, having on a radially outer peripheral side thereof a flexible outer peripheral-side annular seal portion which is brought into contact with a radially inner peripheral surface of the outer peripheral-side cylindrical suspended portion of the upper casing so as to seal a gap between the outer peripheral-side cylindrical suspended portion of the upper casing and the annular protrusion of the lower casing base portion, and having connecting portions for connecting to each other the inner peripheral-side annular seal portion and the outer peripheral-side annular seal portion, wherein the inner peripheral-side annular seal portion and the outer peripheral-side annular seal portion are integrally molded with the connecting portions having respective columnar portions arranged in a plurality of hole portions in the annular upper surface of the annular protrusion of the lower casing base portion.

According to the synthetic resin-made sliding bearing in accordance with the present invention, since the inner peripheral-side annular seal portion and the outer peripheral-side annular seal portion are integrally formed with the connecting portions having respective columnar portions arranged in a plurality of hole portions formed in the annular upper surface of the annular protrusion of the lower casing base portion, the number of parts can be reduced, a reduction in the manufacturing cost can be attained, and the durability can be improved by eliminating the possibility of coming off. In addition, the sealability can be further improved since the seal member has on its radially inner peripheral and outer peripheral sides an inner peripheral-side annular seal portion for sealing the gap between the inner peripheral-side cylindrical suspended portion of the upper casing and a cylindrical surface portion of the annular protrusion of the lower casing base portion and an outer peripheral-side annular seal portion for sealing the gap between the outer peripheral-side cylindrical suspended portion of the upper casing and an outer peripheral cylindrical surface portion of the annular protrusion of the lower casing base portion.

In a preferred embodiment of the synthetic resin-made sliding bearing in accordance with the present invention, the inner peripheral-side annular seal portion includes an annular inner peripheral seal base portion which is joined to a cylindrical inner surface of the annular protrusion of the lower casing base portion in such a manner as to cover a plurality of protrusions which are integrally formed on the cylindrical inner surface of the annular protrusion along a circumferential direction, and a flexible inner peripheral seal portion which is connected to a radial inner peripheral end portion of the inner peripheral seal base portion and which is elastically brought into flexural contact with an outer peripheral surface of the inner peripheral-side cylindrical suspended portion of the upper casing, wherein the inner peripheral seal portion has a smaller thickness than the thickness of the inner peripheral seal base portion and extends diagonally downwardly from an outer peripheral end portion connected to the inner peripheral end portion of the inner peripheral seal base portion.

In addition, the outer peripheral-side annular seal portion may include an annular outer peripheral seal base portion which is joined to an outer peripheral surface continuing to an annular flat portion of an outer peripheral edge of the annular protrusion of the lower casing base portion in such a manner as to cover the outer peripheral surface and a plurality of projections formed integrally on the outer peripheral surface along the circumferential direction, and a flexible outer peripheral seal portion which is connected to the outer peripheral seal base portion and is elastically brought into flexural contact with an inner peripheral surface of a cross-sectionally trapezoidal cylindrical portion of the outer peripheral-side cylindrical suspended portion. This outer peripheral seal portion may have a smaller thickness than the thickness of the outer peripheral seal base portion and may extend diagonally downwardly from an inner peripheral end portion connected to the outer peripheral end portion of the outer peripheral seal base portion.

In a preferred embodiment, the plurality of hole portions are respectively located at discontinuous portions each located between adjacent ones of a plurality of curved projecting portions provided uprightly on an outer peripheral edge portion of the annular upper surface of the annular protrusion of the lower casing base portion along the circumferential direction, wherein the annular protrusion of the lower casing base portion has an outer peripheral-side recessed groove which is open at a radially outer one end thereof to a radially outer side and is open at a radially inner other end thereof to the hole portion, and an inner peripheral-side recessed groove which is open at a radially outer one end thereof to the hole portion and is open at a radially inner other end thereof to a radially inner side, and wherein each of the connecting portions has an outer connecting portion whose radially inner side is formed integrally with the columnar portion, whose radially outer side is formed integrally with the outer peripheral-side annular seal portion, and which is disposed in the outer peripheral-side recessed groove, and an inner connecting portion whose radially outer side is formed integrally with the columnar portion, whose radially inner side is formed integrally with the inner peripheral-side annular seal portion, and which is disposed in the inner peripheral-side recessed groove.

The upper casing may have an annular seat portion formed integrally on a radially central portion of the annular upper surface in the axial direction of the upper casing base portion.

In one preferred embodiment, the inner peripheral-side cylindrical suspended portion has a thick-walled cylindrical portion connected at its axially upper end portion to a radially inner peripheral end of the annular lower surface of the upper casing base portion and a thin-walled cylindrical portion which is connected at its axially upper end portion to an axially lower end of the thick-walled cylindrical portion and is thinner-walled relative to the thick-walled cylindrical portion; the inner peripheral-side annular seal portion is in contact with a radial cylindrical outer peripheral surface of the thin-walled cylindrical portion; and the outer peripheral-side cylindrical suspended portion includes a cross-sectionally trapezoidal cylindrical portion which is connected at its axially upper end portion to a radially outer peripheral end portion of the annular lower surface of the upper casing base portion and has an inner peripheral surface which is gradually enlarged in diameter as viewed in a direction away from the annular lower surface of the upper casing base portion in the axial direction, as well as a cylindrical portion which is connected to an axially lower end of the cross-sectionally trapezoidal cylindrical portion, the outer peripheral-side annular seal portion being in contact with the cross-sectionally trapezoidal cylindrical portion.

The sliding bearing piece may include an annular thrust sliding bearing piece portion having an annular upper surface which is brought into slidable contact with the annular lower surface of the upper casing base portion and an annular lower surface which is brought into contact with the annular upper surface of the annular protrusion of the lower casing base portion; a cylindrical radial sliding bearing piece portion which is integrally formed at one end portion thereof on one end portion of the thrust sliding bearing piece portion in such a manner as to extend axially downwardly from the one end portion of the thrust sliding bearing piece portion and has an annular inner side surface which is brought into slidable contact with the outer peripheral surface of the inner peripheral-side cylindrical suspended portion of the upper casing base portion and an annular outer side surface which is brought into contact with the inner peripheral surface of the annular protrusion of the lower casing base portion; and a plurality of radial projecting plate piece portions which project radially outwardly from an outer peripheral surface of the thrust sliding bearing piece portion and are respectively arranged at the discontinuous portions each located between adjacent ones of the curved projecting portions provided uprightly on the outer peripheral edge portion of the annular upper surface of the annular protrusion of the lower casing base portion along the outer peripheral edge portion in the circumferential direction, so that the sliding bearing piece does not rotate in the circumferential direction with respect to the lower casing.

The thrust sliding bearing piece portion may have an annular groove provided on an inner peripheral side of an annular upper surface thereof and a plurality of radial grooves which are open at one ends thereof to the annular groove and are open at other ends thereof to the outer peripheral surface, and which are provided on the upper surface by being spaced apart at equal intervals in the circumferential direction, and the radial sliding bearing piece portion has a plurality of axial grooves which are open at their both ends and are provided on the annular inner side surface by being spaced apart at equal intervals in the circumferential direction. Alternatively, the thrust sliding bearing piece portion may have pluralities of inner recessed portions and outer recessed portions which are formed in an annular upper surface thereof along the circumferential direction and in at least two rows including an inner row and an outer row in the radial direction, and the radial sliding bearing piece portion has a plurality of axial grooves which are open at their both ends and are provided on the annular inner side surface by being spaced apart at equal intervals in the circumferential direction.

In a preferred embodiment, the inner peripheral-side annular seal portion and the outer peripheral-side annular seal portion are insert molded on the annular protrusion of the lower casing base portion together with the connecting portions.

The synthetic resin-made sliding bearing in accordance with the present invention is preferably used as a thrust sliding bearing of a strut-type suspension in a four-wheeled motor vehicle.

The synthetic resin for forming the upper casing may be a thermoplastic synthetic resin such as polyacetal resin, polyamide resin, or polybutylene terephthalate resin. In addition, the synthetic resin for forming the lower casing may be a thermoplastic synthetic resin such as polyacetal resin, polyamide resin, or polybutylene terephthalate resin containing reinforcing fibers including glass fibers, carbon fibers, and the like. The synthetic resin for forming the sliding bearing piece may be a thermoplastic synthetic resin such as polyacetal resin, polyamide resin, polybutylene terephthalate resin, or polyolefin resin such as polyester resin. As the synthetic resin for forming the seal member, it is possible to cite polyurethane resin, a polyester elastomer, or the like as preferred examples.

Advantages of the Invention

According to the present invention, it is possible to provide a synthetic resin-made sliding bearing which is capable of reliably preventing the ingress of dust and the like onto sliding surfaces without causing a decline in the sliding characteristics due to the ingress of the dust and the like, and which makes it possible to reduce time in the assembly operation and does not easily come off due to vibrations and the like, thereby making it possible to improve the manufacturing cost, durability, and sealability and maintain smooth steering during the steering operation over extended periods of time.

MODE FOR CARRYING OUT THE INVENTION

Figure 1:
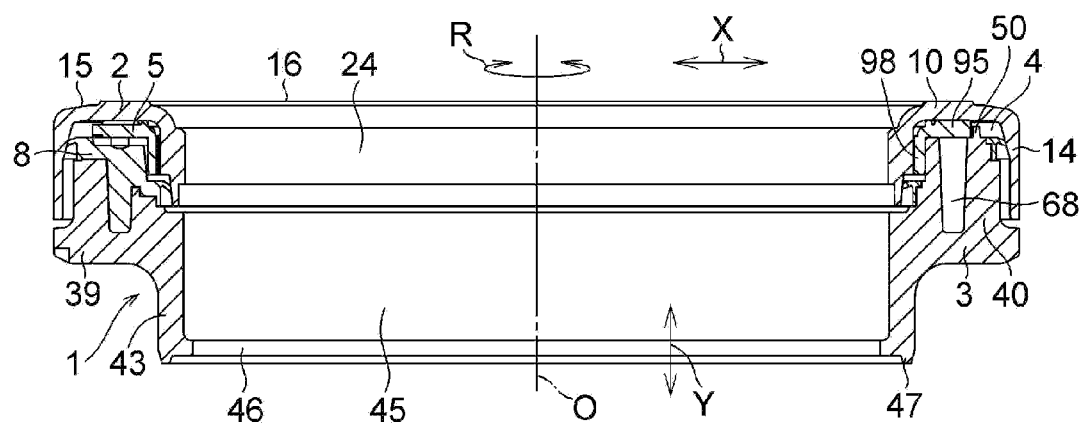
FIG. 1 is an explanatory cross-sectional view, taken in the direction of arrows along line I-I shown in FIG. 3, of a preferred embodiment of the present invention.
Figure 2:
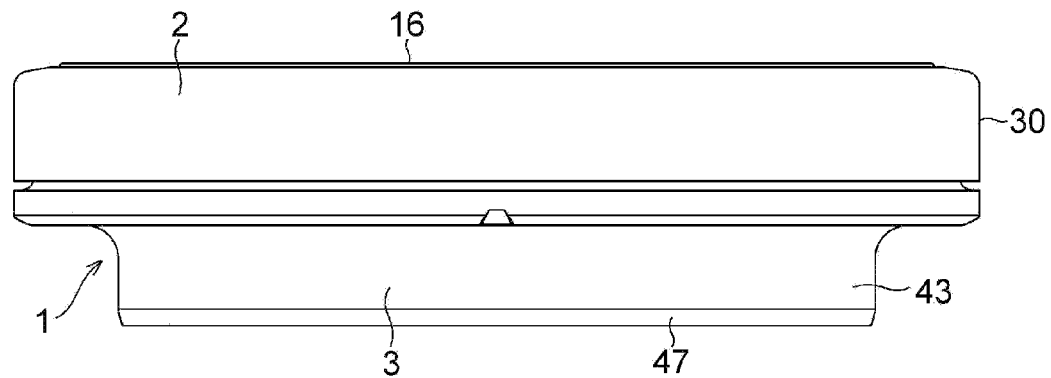
FIG. 2 is an explanatory front elevational view of the embodiment shown in FIG. 1.
Figure 3:
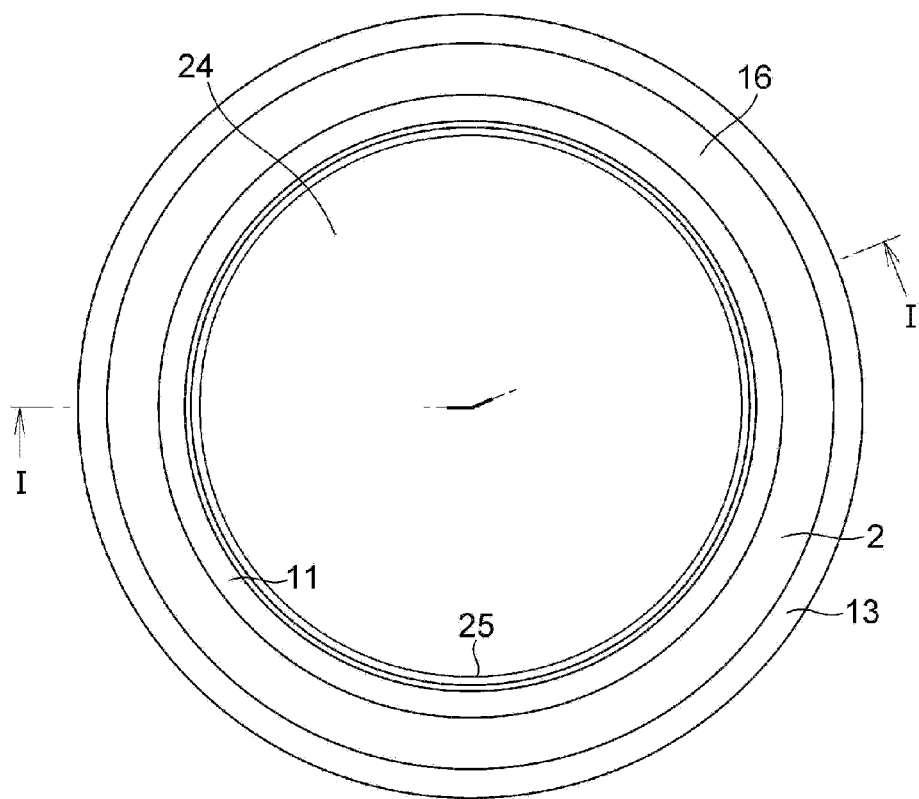
FIG. 3 is an explanatory plan view of the embodiment shown in FIG. 1.
Figure 4:
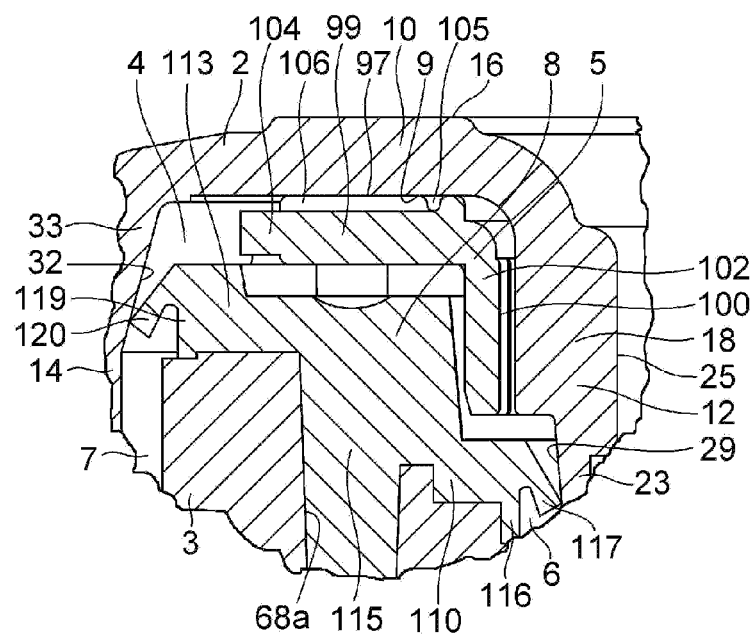
FIG. 4 is an explanatory partially enlarged cross-sectional view of the embodiment shown in FIG. 1.
Figure 5:
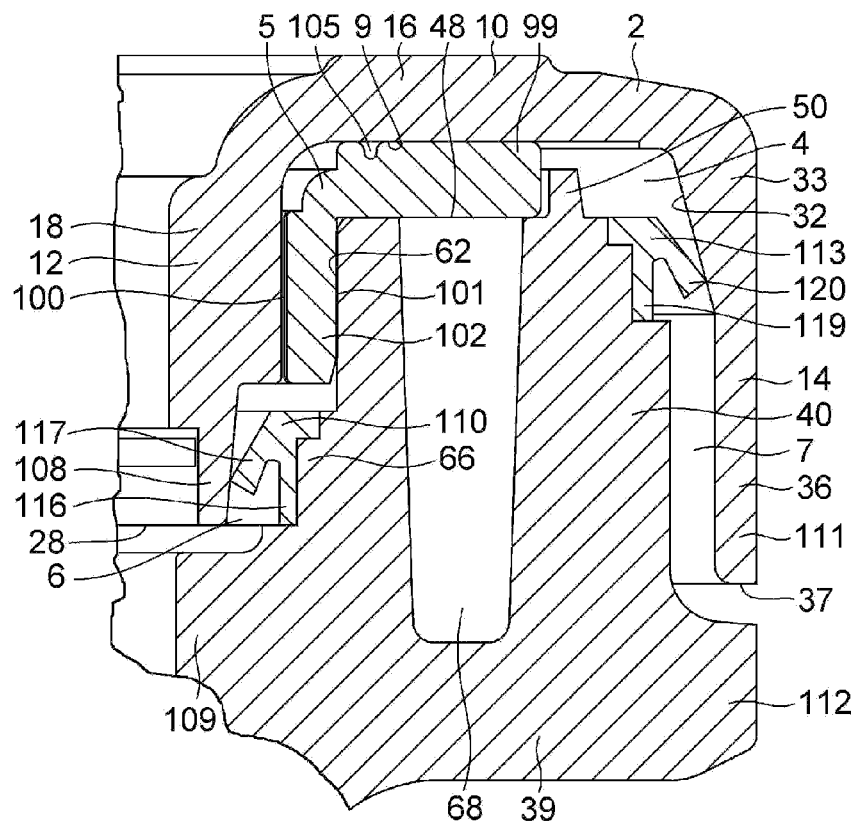
FIG. 5 is an explanatory partially enlarged cross-sectional view of the embodiment shown in FIG. 1.

Hereafter, a more detailed description will be given of the present invention with reference to the preferred embodiment illustrated in the drawings. It should be noted that the present invention is not limited to the embodiment.

In FIGS. 1 to 5, a sliding bearing 1 in accordance with this embodiment for use in a strut-type suspension of a four-wheeled motor vehicle is comprised of a synthetic resin-made upper casing 2 which is fixed to a vehicle body side via a mounting member; a synthetic resin-made lower casing 3 which is superposed on the upper casing 2 so as to be rotatable about an axis O in a circumferential direction R relative to the upper casing 2 and where a spring bearing surface for a suspension coil spring is formed; a synthetic resin-made sliding bearing piece 5 disposed in an annular space 4 between the upper casing 2 and the lower casing 3; and a synthetic resin-made seal member 8 for sealing respective other annular end portions, communicating with the outside, of a gap 6 on an inner peripheral side and a gap 7 on an outer peripheral side in a radial direction X between the upper casing 2 and the lower casing 3, the gap 6 and the gap 7 respectively communicating with the annular space 4 at their one annular end portions.

Figure 6:
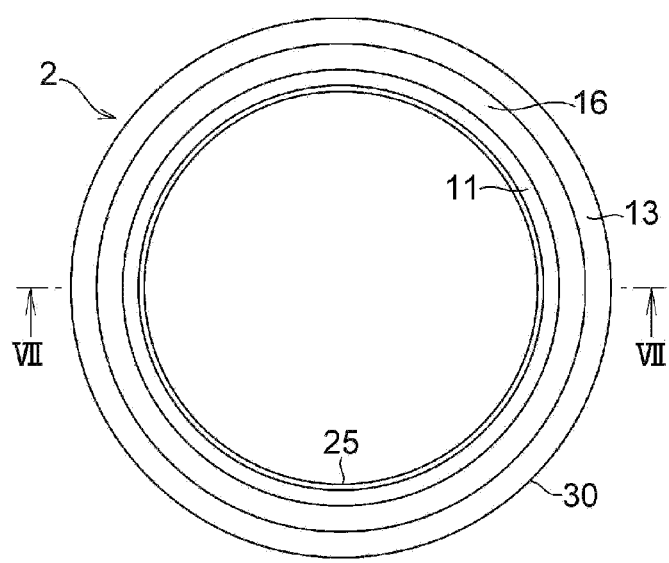
FIG. 6 is an explanatory plan view of an upper casing of the embodiment shown in FIG. 1.
Figure 7:
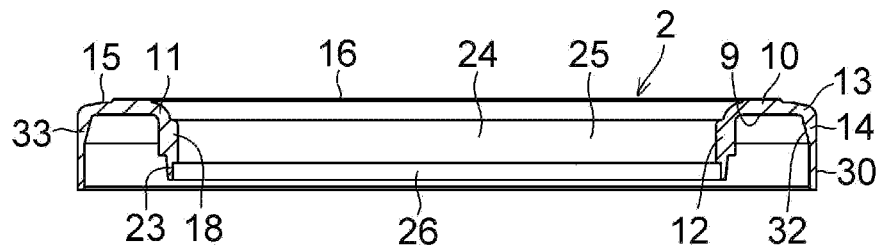
FIG. 7 is an explanatory cross-sectional view, taken in the direction of arrows along line VII-VII, of the upper casing shown in FIG. 6 in the embodiment shown in FIG. 1.
Figure 8:
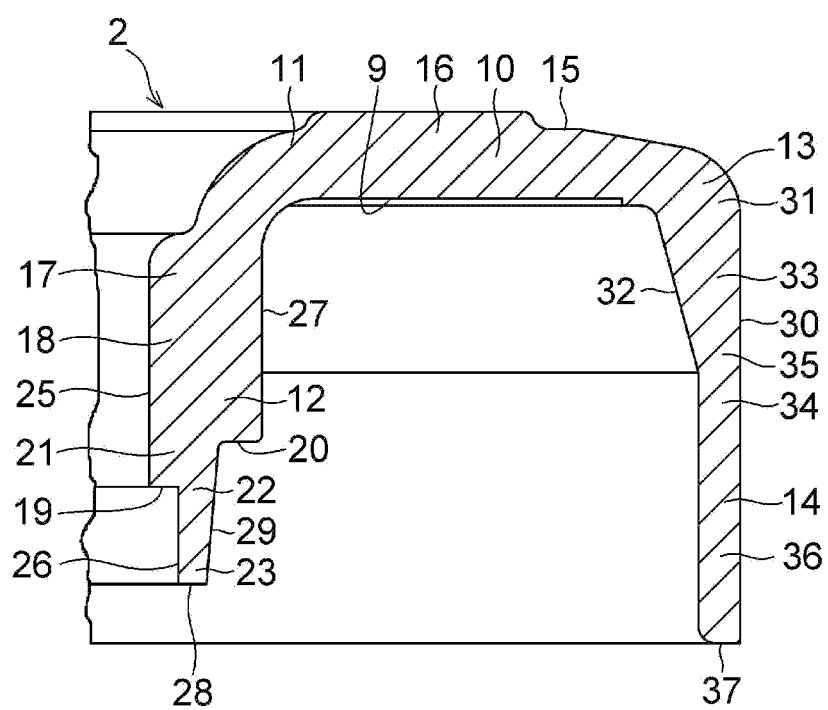
FIG. 8 is an explanatory partially enlarged cross-sectional view of the upper casing shown in FIG. 7 in the embodiment shown in FIG. 1.
Figure 9:
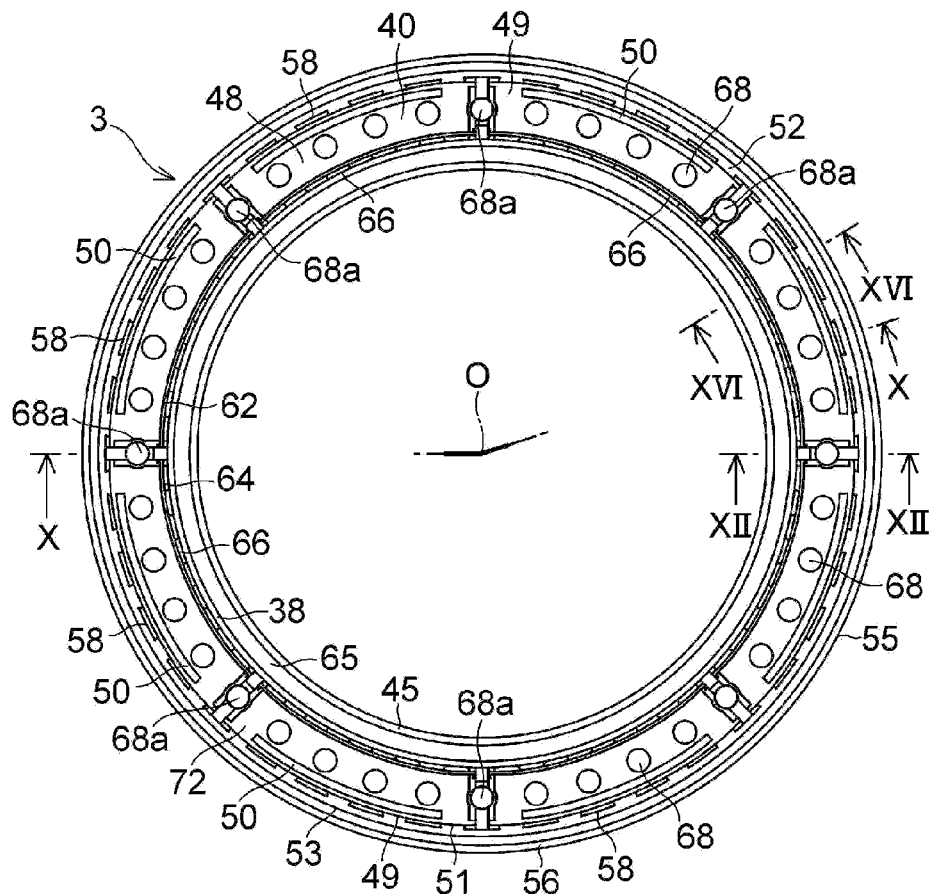
FIG. 9 is an explanatory plan view of a lower casing of the embodiment shown in FIG. 1.
Figure 10:
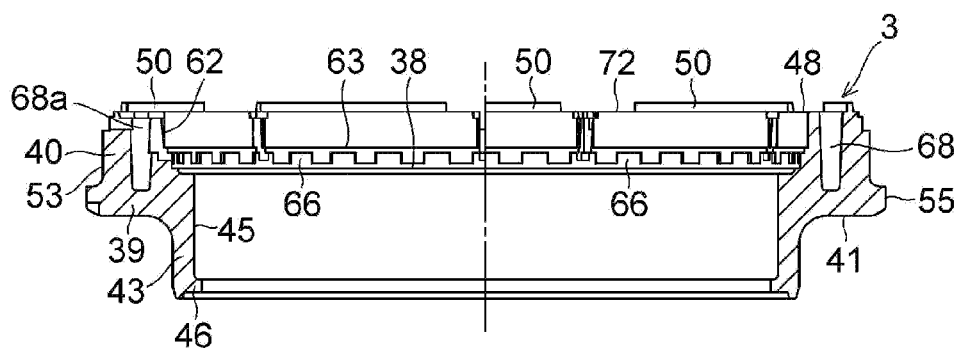
FIG. 10 is an explanatory cross-sectional view, taken in the direction of arrows along line X-X, of the lower casing shown in FIG. 9.
Figure 11:
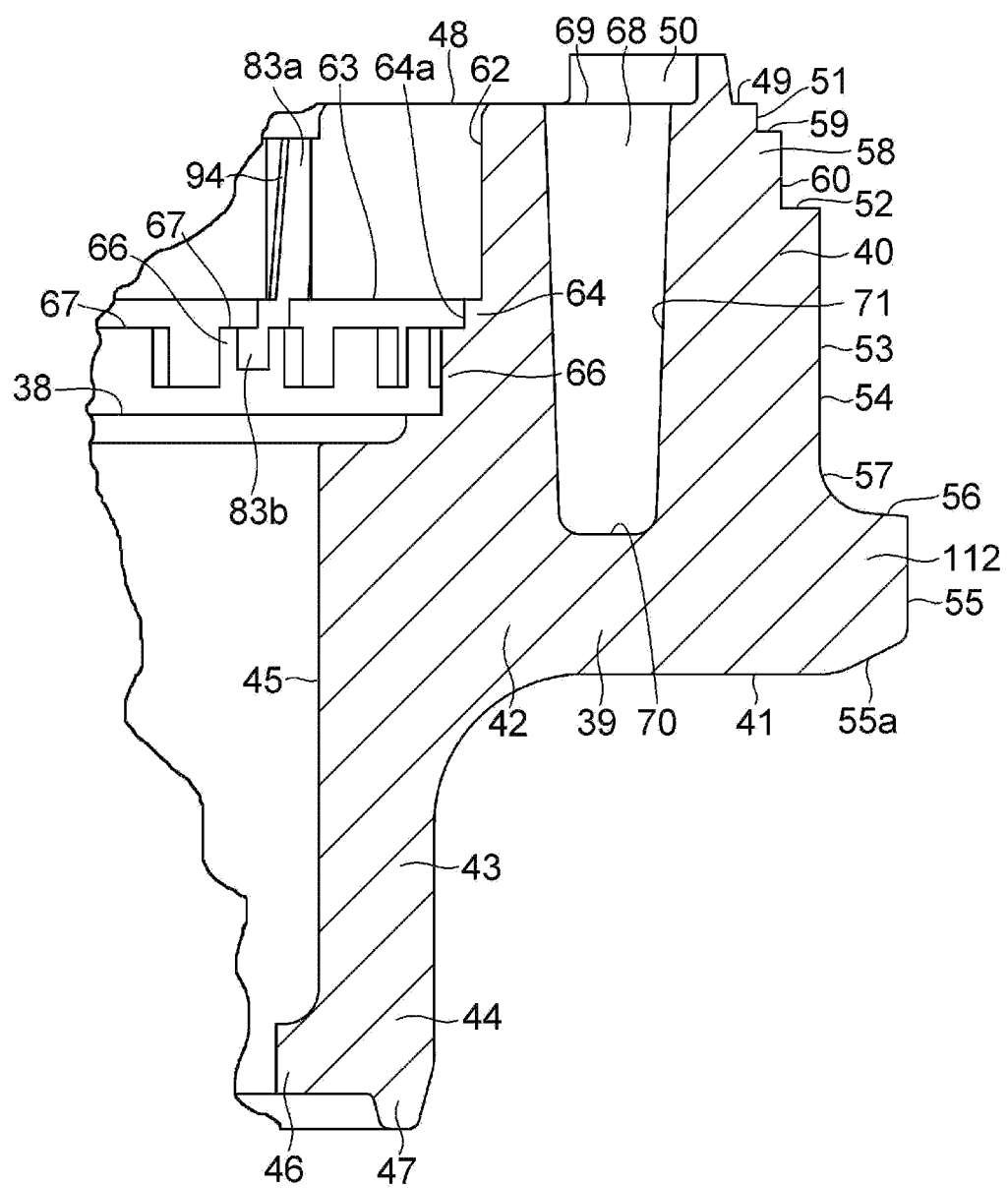
FIG. 11 is an explanatory partially enlarged cross-sectional view of the lower casing shown in FIG. 10.
Figure 12:
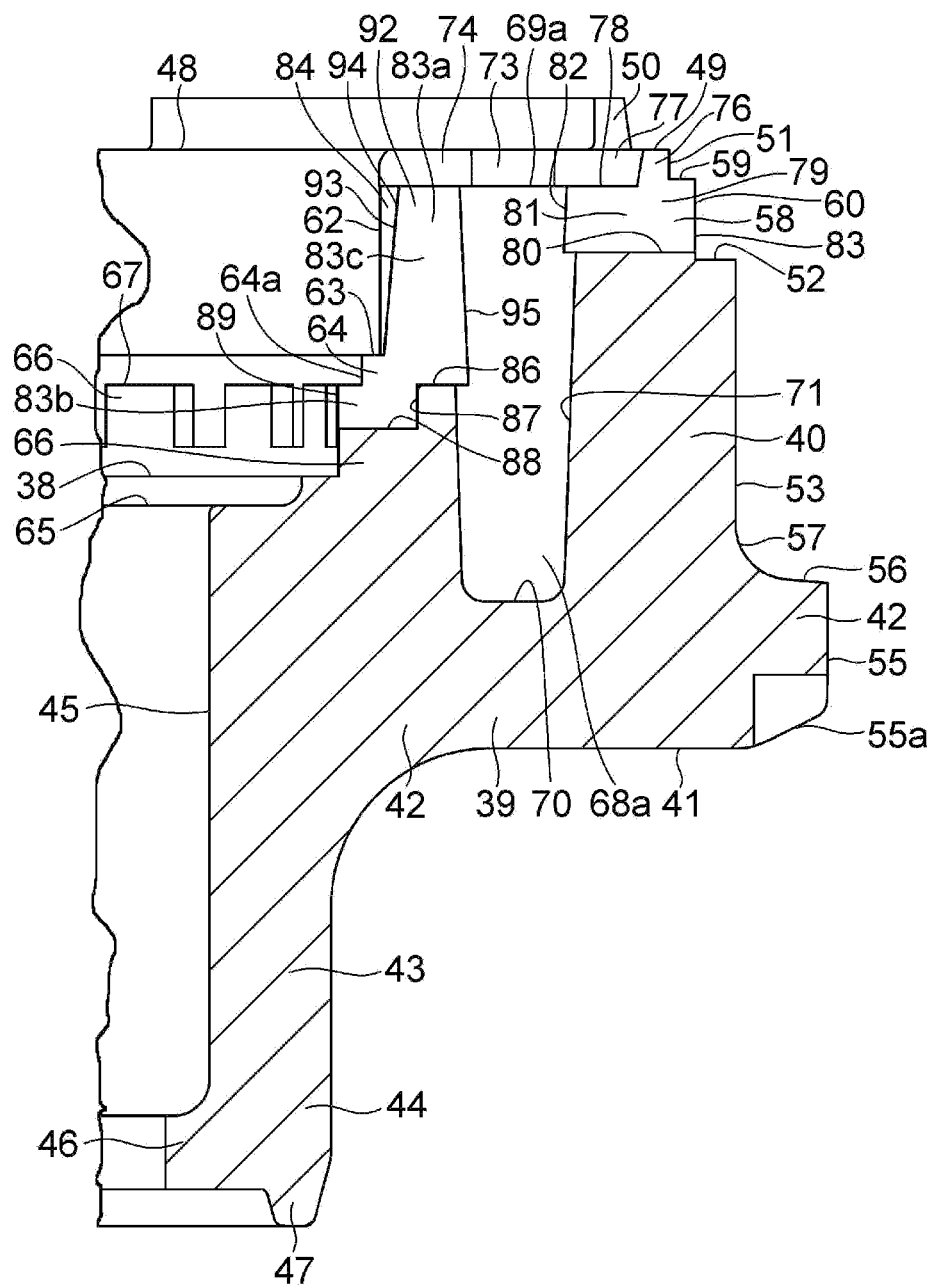
FIG. 12 is an explanatory enlarged cross-sectional view, taken in the direction of arrows along line XII-XII, of the lower casing shown in FIG. 9.
Figure 13:
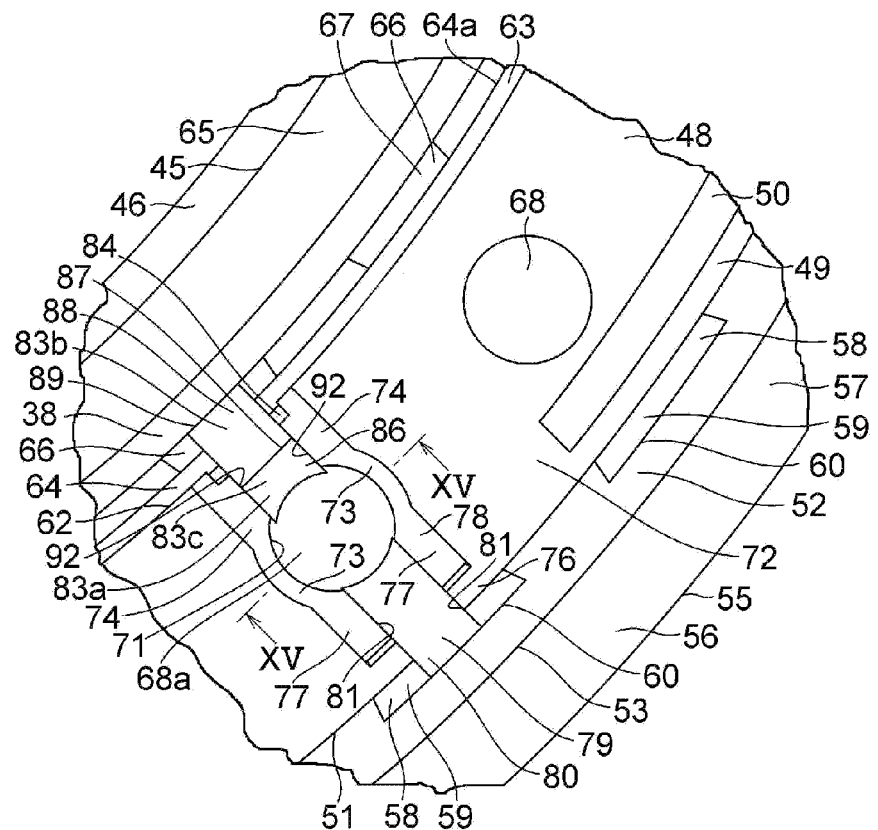
FIG. 13 is an explanatory partially enlarged plan view of the lower casing shown in FIG. 9.
Figure 14:
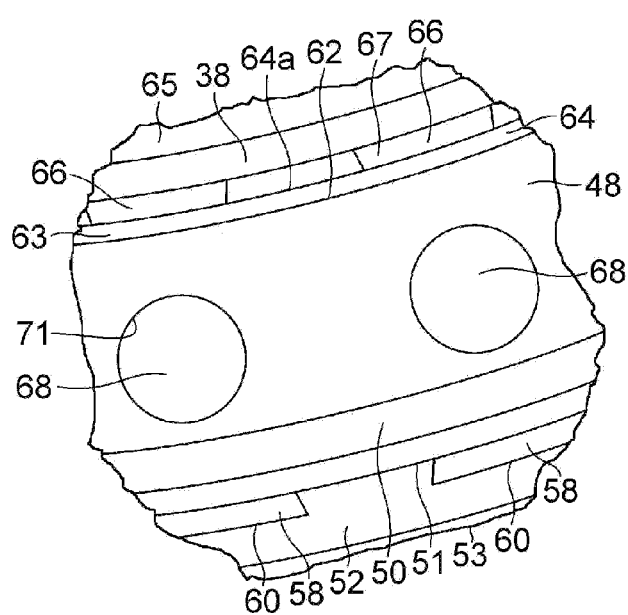
FIG. 14 is an explanatory partially enlarged plan view of the lower casing shown in FIG. 9.
Figure 15:
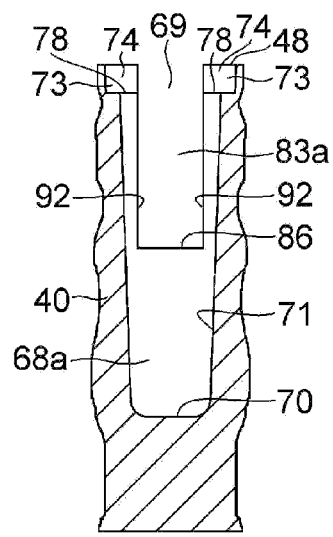
FIG. 15 is an explanatory cross-sectional view, taken in the direction of arrows XV-XV, of the lower casing shown in FIG. 13.
Figure 16:
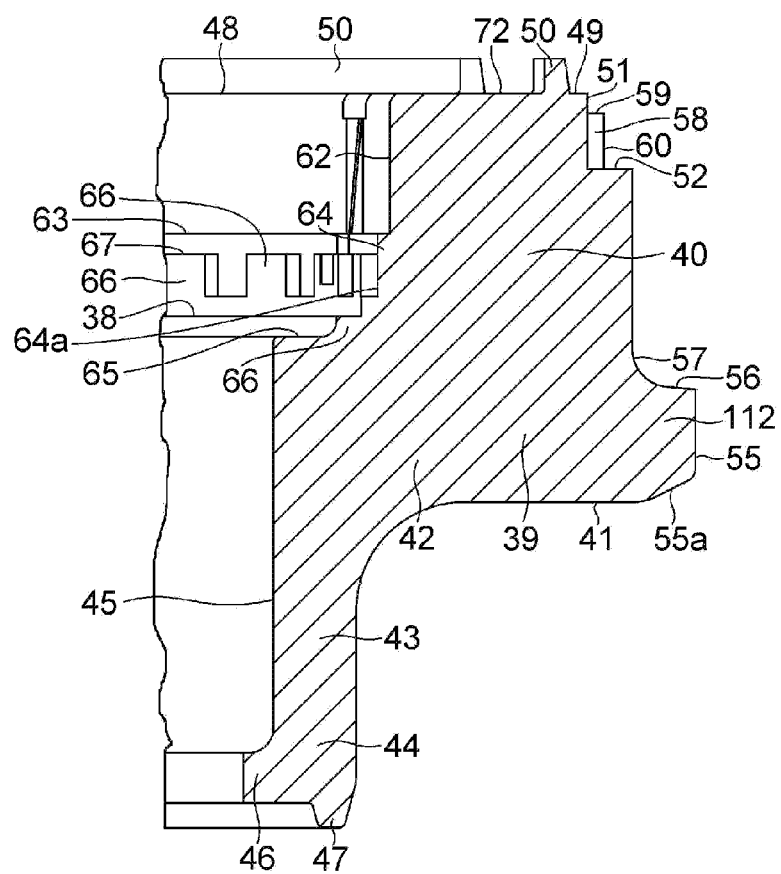
FIG. 16 is an explanatory cross-sectional view, taken in the direction of arrows XVI-XVI, of the lower casing shown in FIG. 9.
Figure 17:
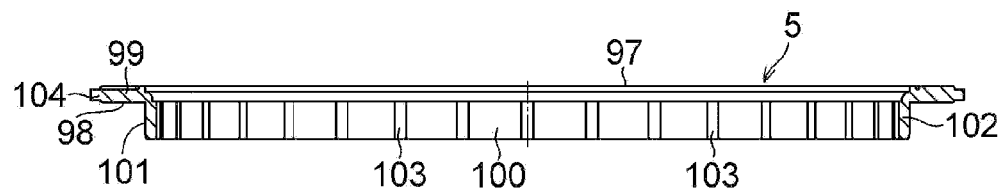
FIG. 17 is an explanatory cross-sectional view, taken in the direction of arrows XVII-XVII, of a sliding bearing piece shown in FIG. 18.
Figure 18:
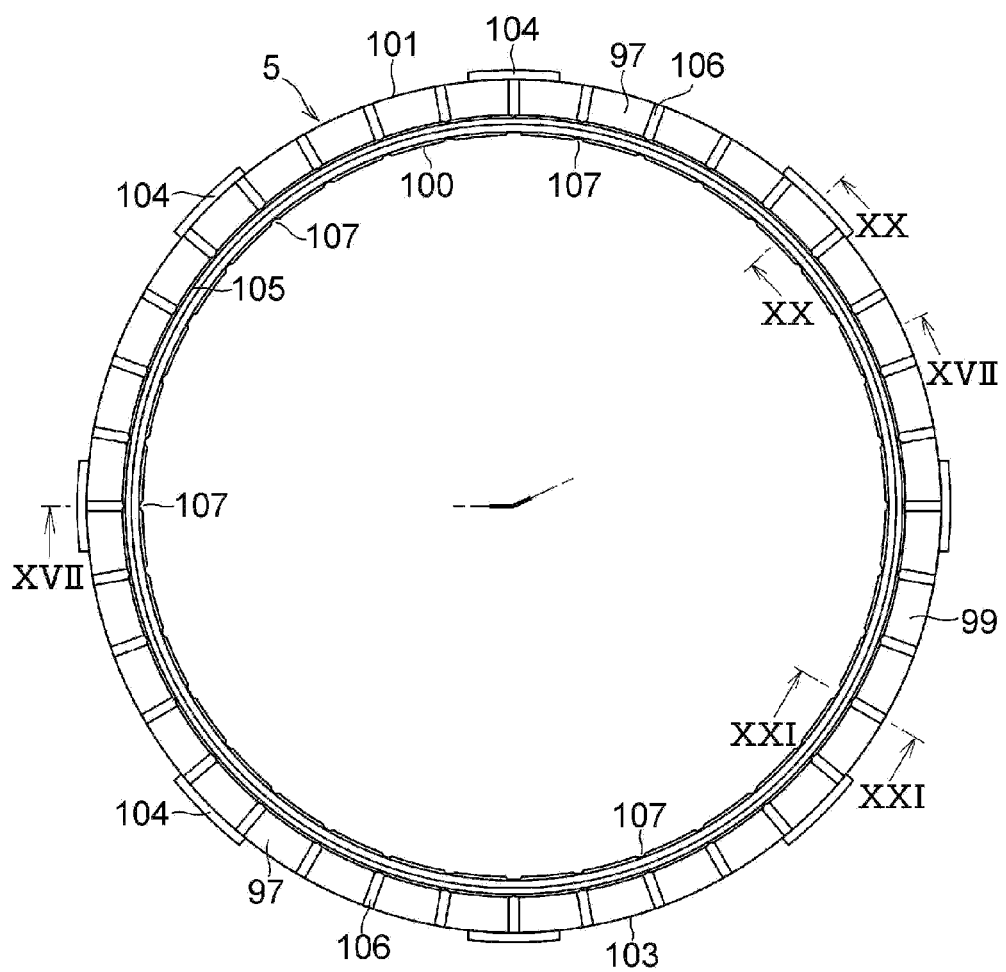
FIG. 18 is an explanatory plan view of the sliding bearing piece of the embodiment shown in FIG. 1.
Figure 19:
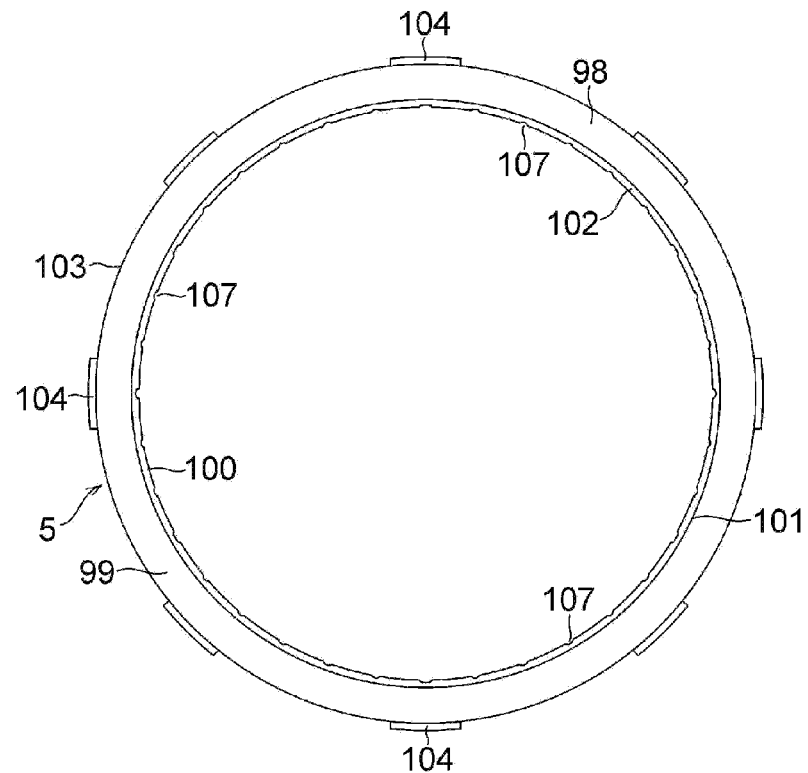
FIG. 19 is an explanatory bottom view of the sliding bearing piece of the embodiment shown in FIG. 1.
Figure 20:
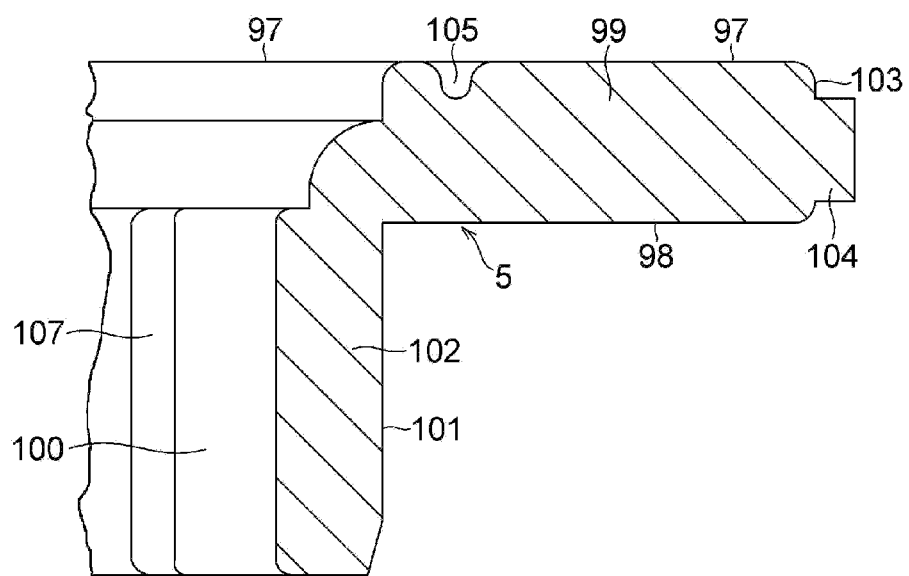
FIG. 20 is an explanatory cross-sectional view, taken in the direction of arrows along line XX-XX, of the sliding bearing piece shown in FIG. 18.
Figure 21:
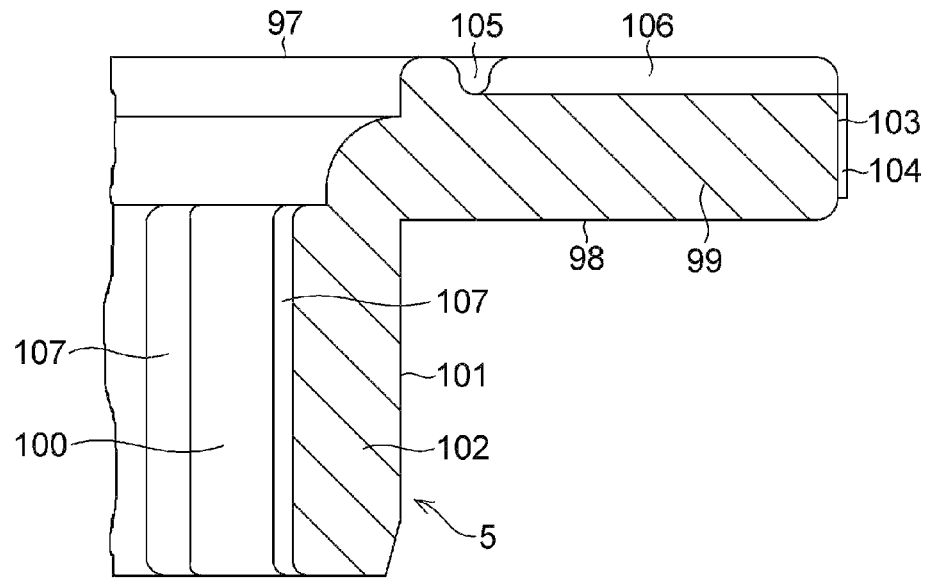
FIG. 21 is an explanatory enlarged view, taken in the direction of arrows along line XXI-XXI, of the sliding bearing piece shown in FIG. 18.
Figure 22:
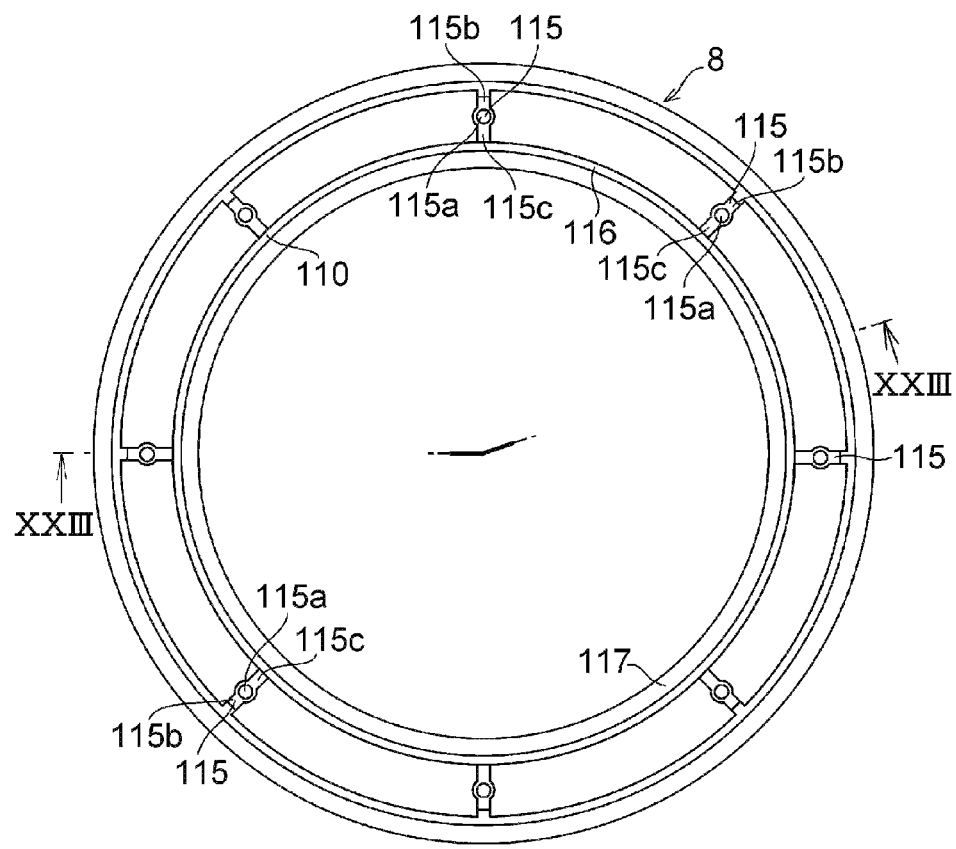
FIG. 22 is an explanatory plan view of a seal member of the embodiment shown in FIG. 1.
Figure 23:
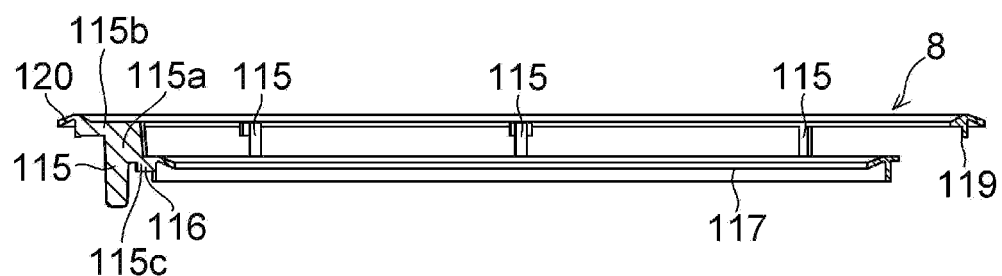
FIG. 23 is an explanatory cross-sectional view, taken in the direction of arrows along line XXIII-XXIII, of the seal member shown in FIG. 22.
Figure 24:
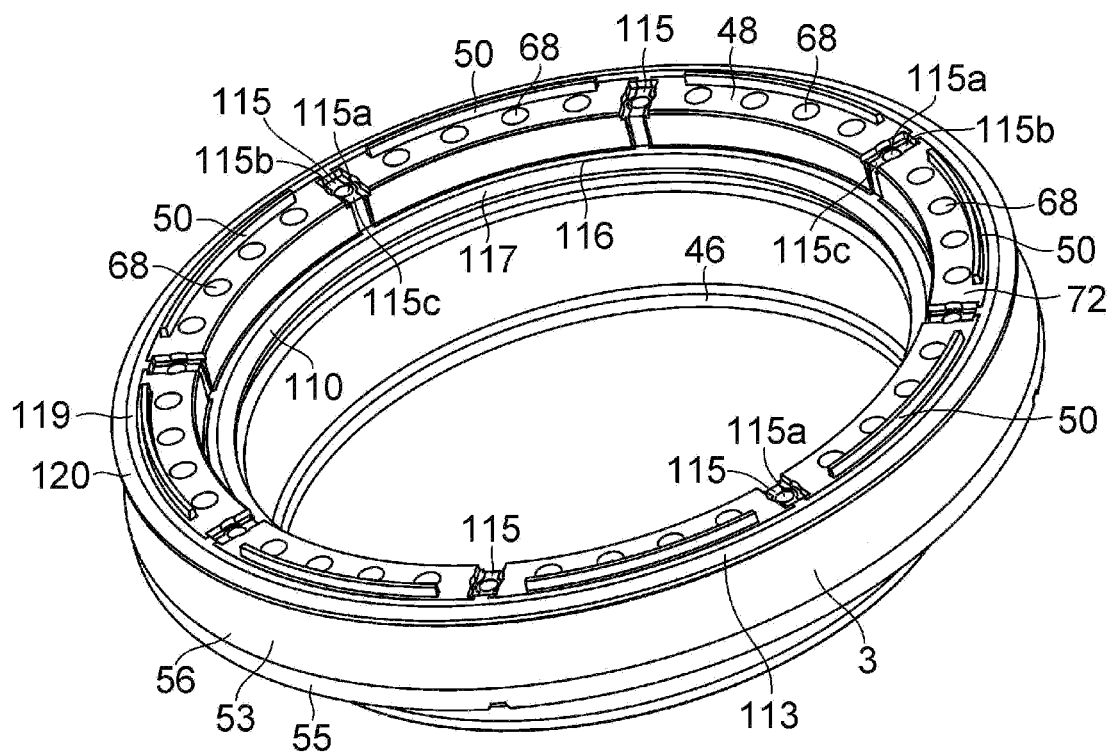
FIG. 24 is an explanatory perspective view of the lower casing having the seal member of the embodiment shown in FIG. 1.
Figure 25:
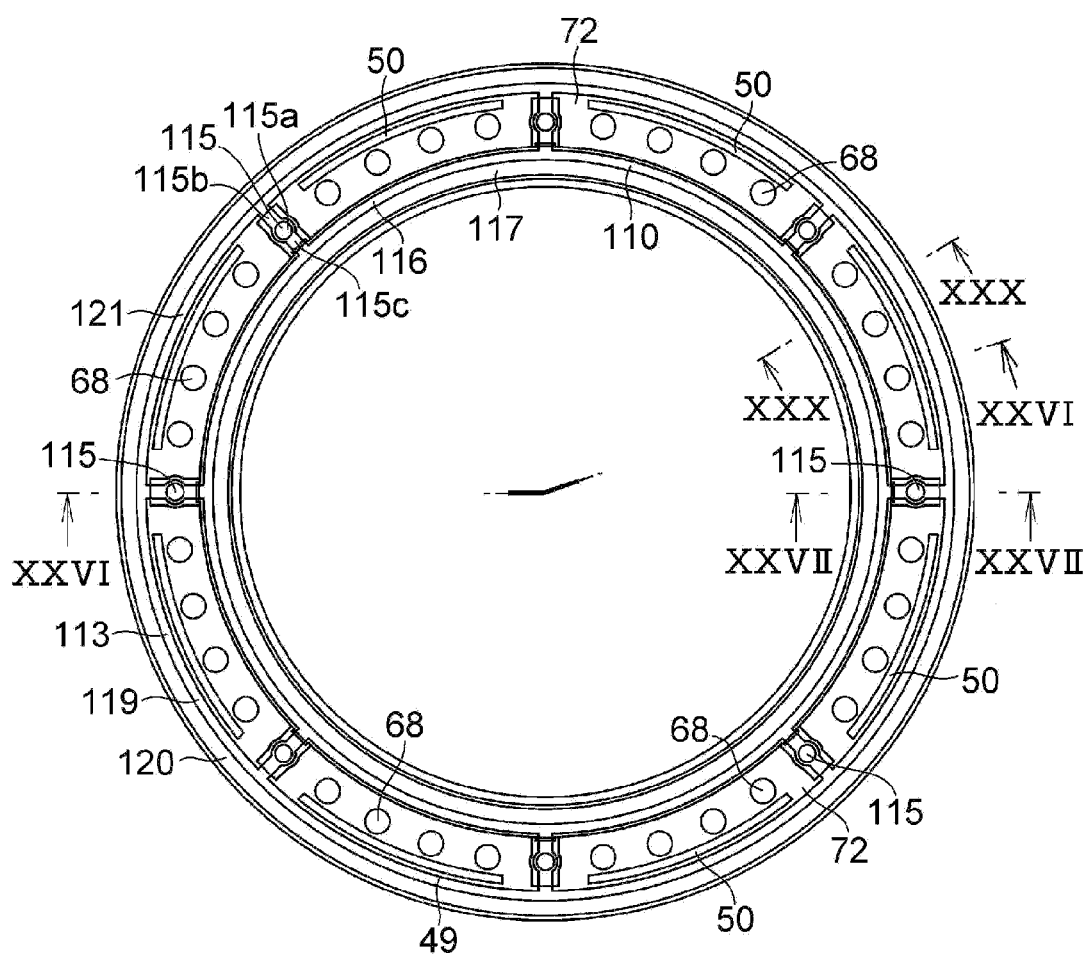
FIG. 25 is an explanatory plan view of the lower casing having the seal member of the embodiment shown in FIG. 1.
Figure 26:
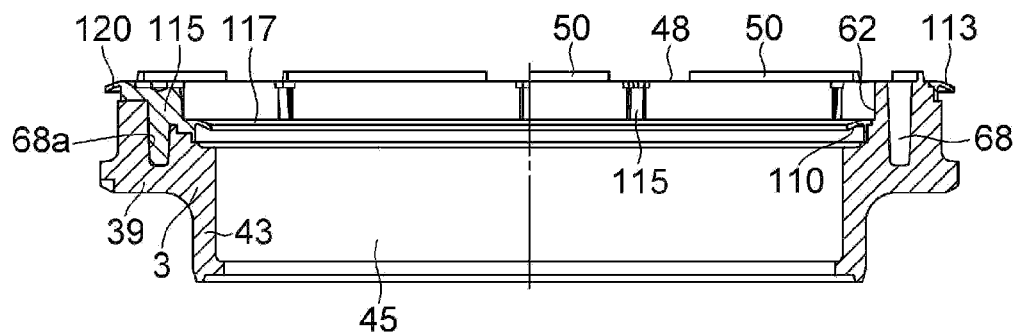
FIG. 26 is an explanatory cross-sectional view, taken in the direction of arrows along line XXVI-XXVI, of the lower casing having the seal member shown in FIG. 25.
Figure 27:
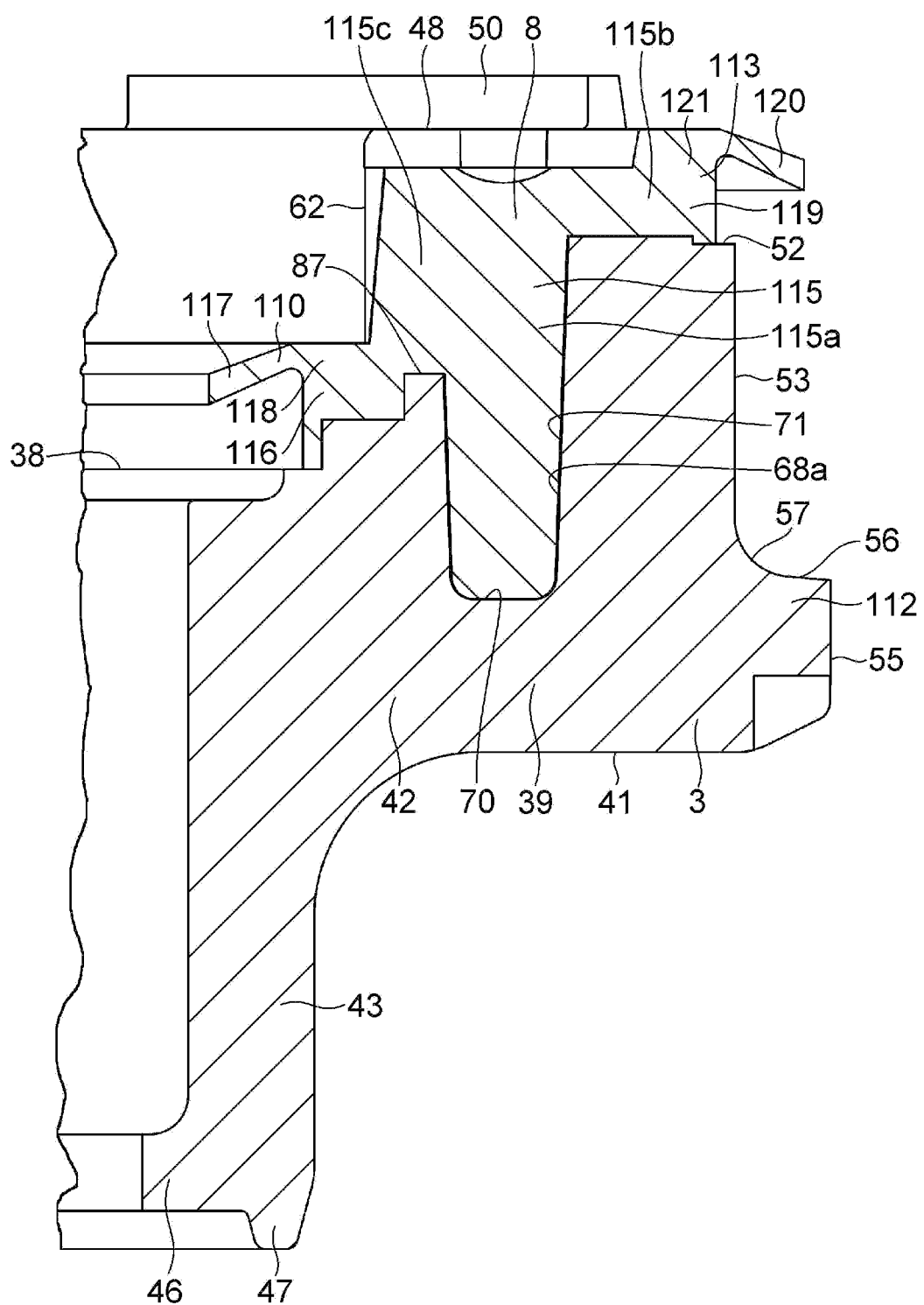
FIG. 27 is an explanatory cross-sectional view, taken in the direction of arrows along line XXVII-XXVII, of the lower casing having the seal member shown in FIG. 25.
Figure 28:
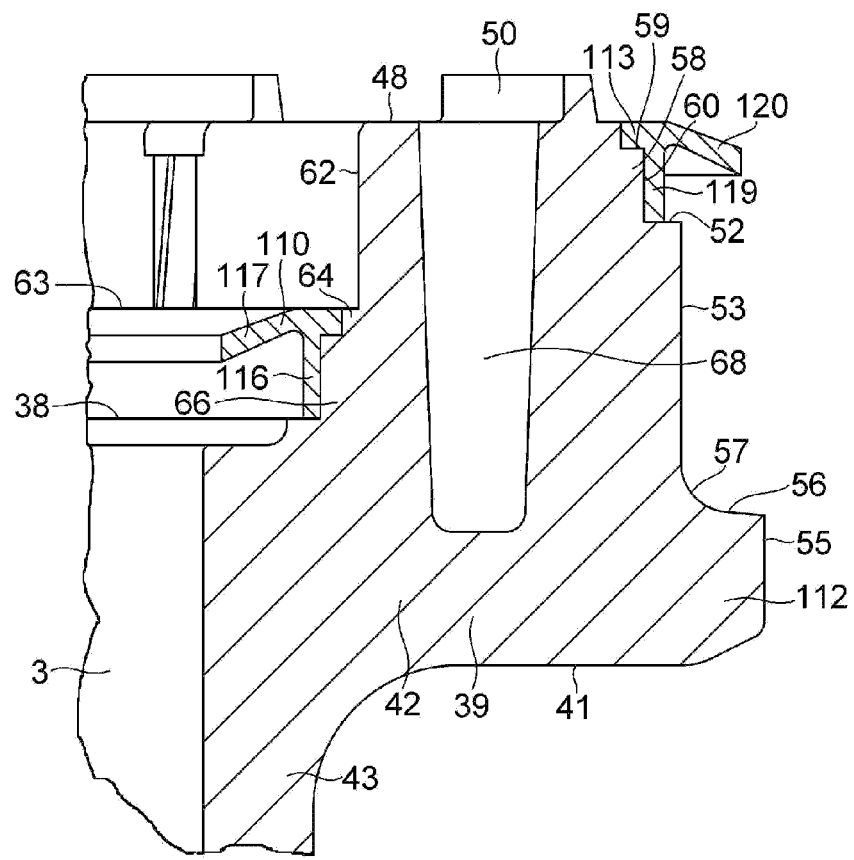
FIG. 28 is an explanatory partially enlarged cross-sectional view of the lower casing having the seal member shown in FIG. 26.
Figure 29:
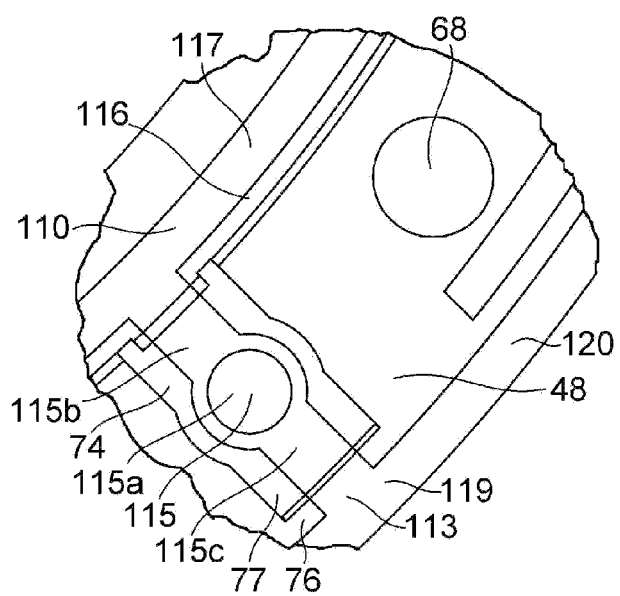
FIG. 29 is an explanatory partially enlarged plan view of the lower casing having the seal member shown in FIG. 25.
Figure 30:
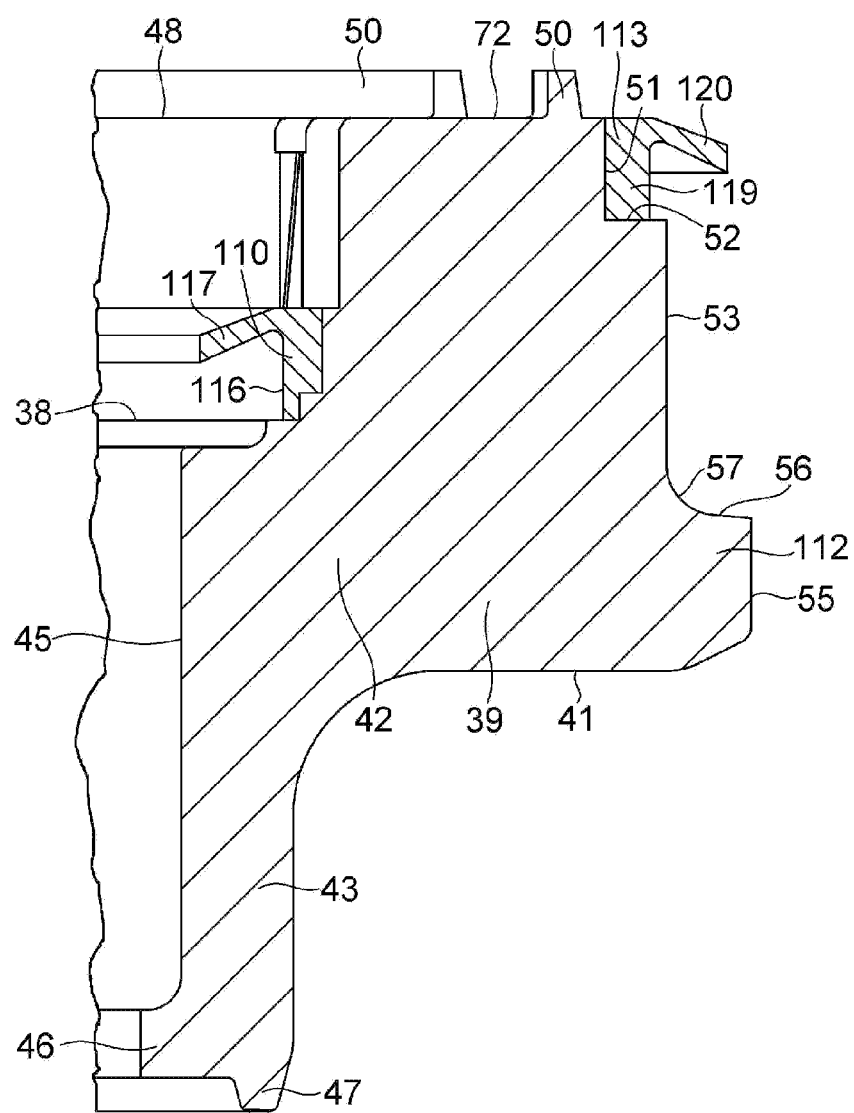
FIG. 30 is an explanatory cross-sectional view, taken in the direction of arrows along line XXX-XXX, of the lower casing having the seal member shown in FIG. 25.
Figure 31:
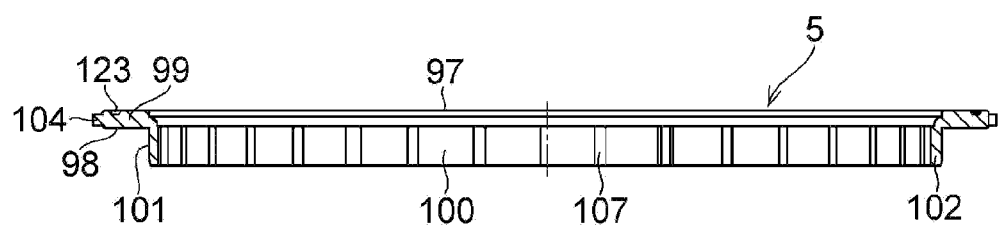
FIG. 31 is an explanatory cross-sectional view, taken in the direction of arrows along line XXXI-XXXI shown in FIG. 32, of another example of the sliding bearing piece in the embodiment shown in FIG. 1.
Figure 32:
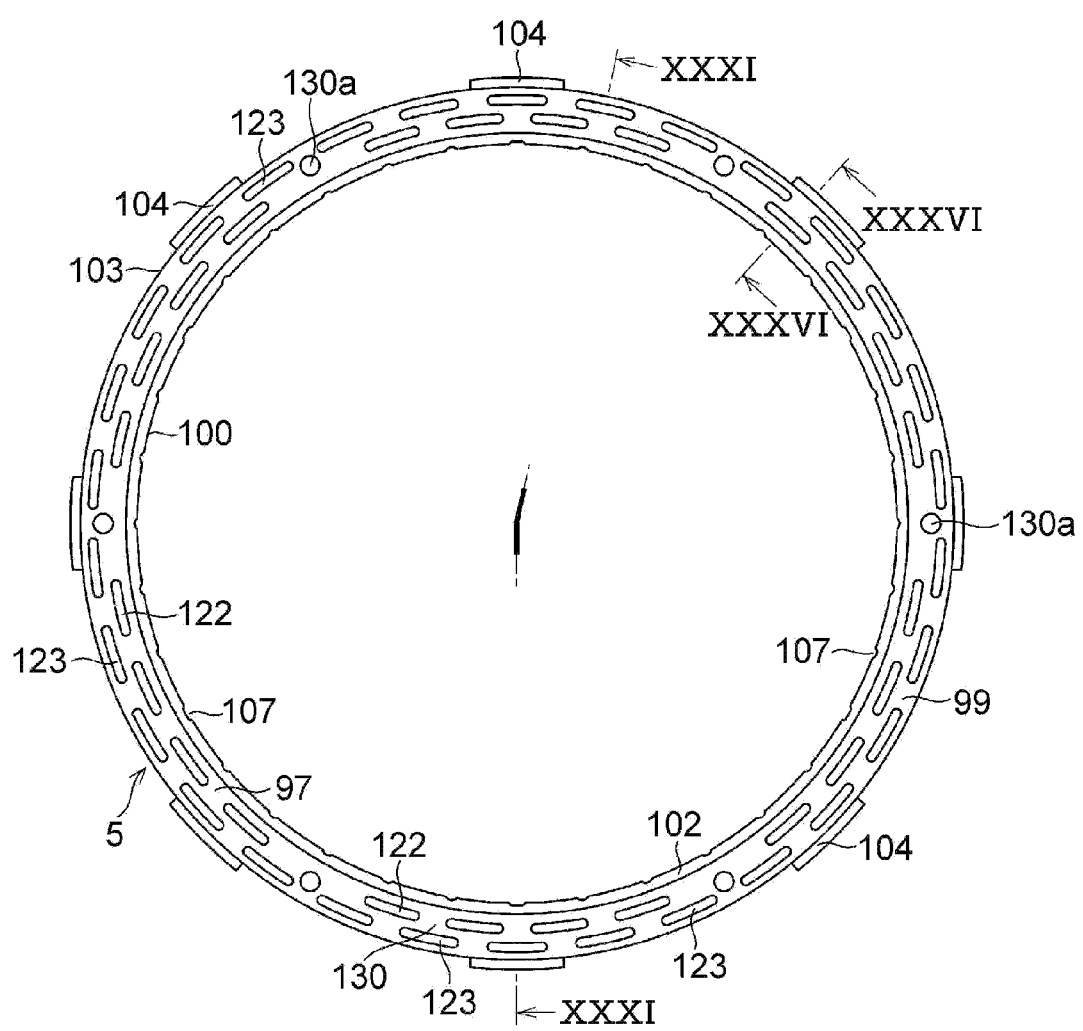
FIG. 32 is an explanatory plan view of the sliding bearing piece shown in FIG. 30.
Figure 33:
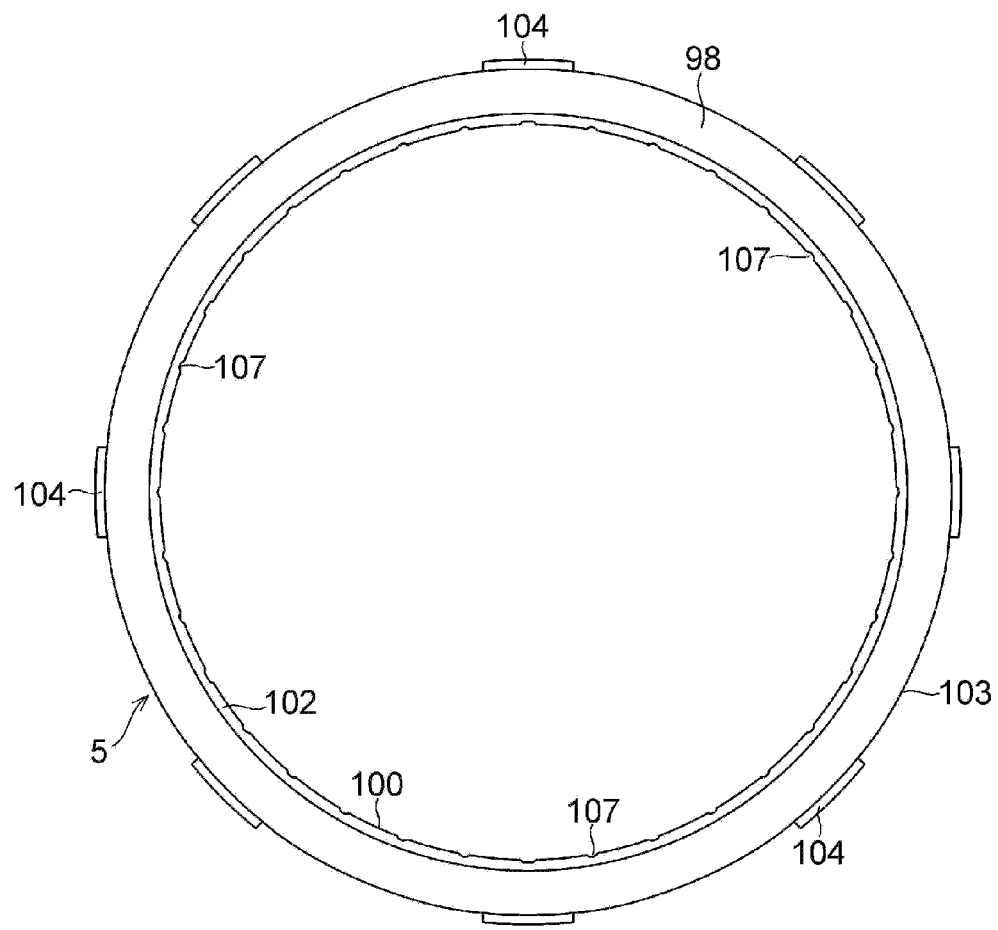
FIG. 33 is an explanatory bottom view of the sliding bearing piece shown in FIG. 30.
Figure 34:
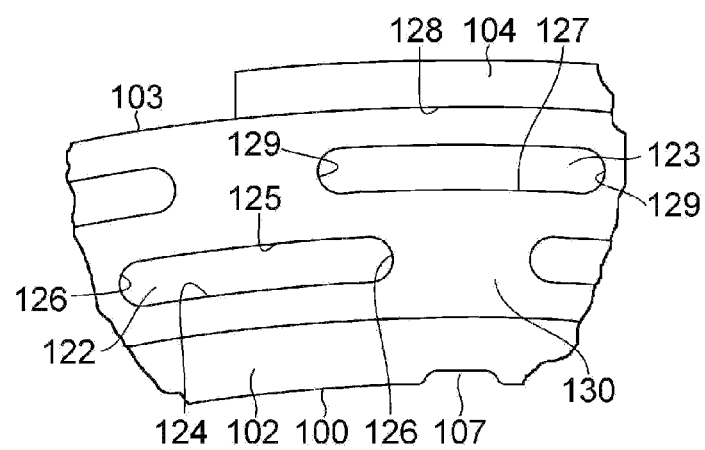
FIG. 34 is an explanatory partially enlarged cross-sectional view of the sliding bearing piece shown in FIG. 30.
Figure 35:
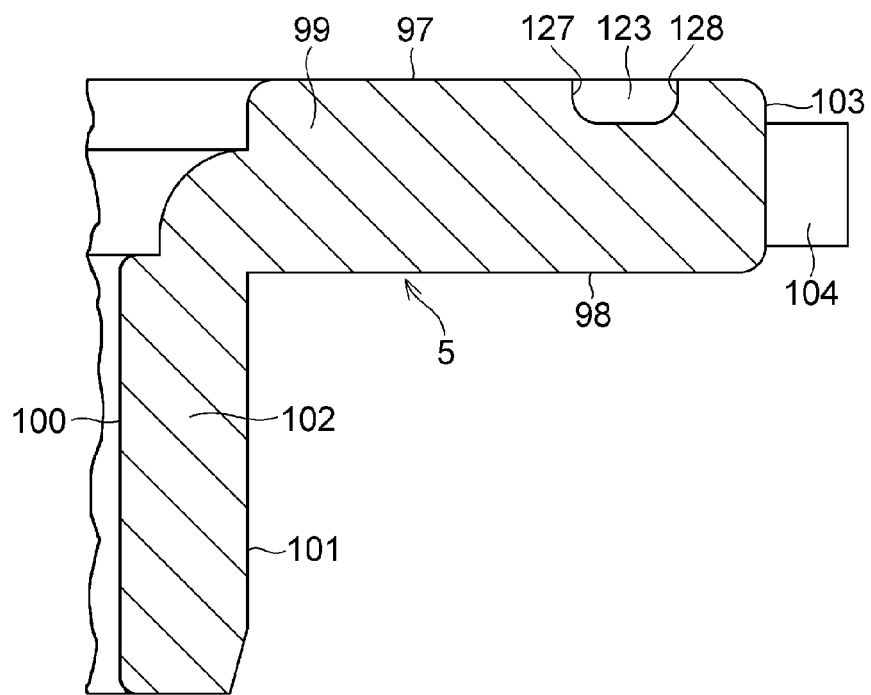
FIG. 35 is an explanatory partially enlarged cross-sectional view of the sliding bearing piece shown in FIG. 31.
Figure 36:
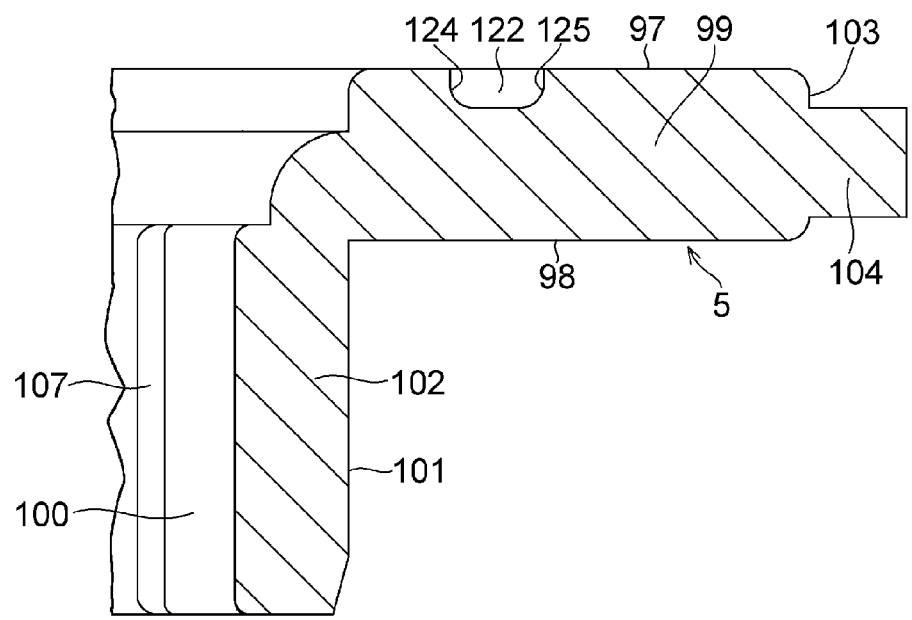
FIG. 36 is an explanatory cross-sectional view, taken in the direction of arrows along line XXXVI-XXXVI, of the sliding bearing piece shown in FIG. 32.

As particularly shown in detail in FIGS. 6 to 8, the upper casing 2 integrally includes an annular upper casing base portion 10 having an annular lower surface 9 in an axial direction Y, an inner peripheral-side cylindrical suspended portion 12 suspended from an inner peripheral end portion 11 in the radial direction X of the annular lower surface 9 of the upper casing base portion 10, an outer peripheral-side cylindrical suspended portion 14 suspended from an outer peripheral end portion 13 in the radial direction X of the annular lower surface 9 of the upper casing base portion 10, and an annular seat portion 16 formed protrudingly on a central portion in the radial direction X of an annular upper surface 15 of the upper casing base portion 10.

The inner peripheral-side cylindrical suspended portion 12 has a thick-walled cylindrical portion 18 connected at its upper end portion 17 to the inner peripheral end portion 11 of the annular lower surface 9 of the upper casing base portion 10, as well as a thin-walled cylindrical portion 23 which is connected at its upper end portion 22 to a lower end portion 21 of the thick-walled cylindrical portion 18 via an inner peripheral-side stepped annular surface 19 and an outer peripheral-side stepped annular surface 20 and is thinner-walled relative to the thick-walled cylindrical portion 18.

The thick-walled cylindrical portion 18 and the thin-walled cylindrical portion 23 respectively have cylindrical inner peripheral surfaces 25 and 26 which define a through hole 24 through which a shaft member of a strut-type suspension is inserted. The thick-walled cylindrical portion 18 has a cylindrical outer peripheral surface 27, and the thin-walled cylindrical portion 23 has a truncated conical outer peripheral surface 29 which is smaller in diameter than the outer peripheral surface 27, and is tapered from the outer peripheral-side stepped annular surface 20 toward an annular end face 28.

The outer peripheral-side cylindrical suspended portion 14 having a cylindrical outer peripheral surface 30 includes a cross-sectionally trapezoidal cylindrical portion 33 which is connected at its upper end portion 31 to the outer peripheral end portion 13 of the annular lower surface 9 of the upper casing base portion 10 and has an inner peripheral surface 32 which is gradually enlarged in diameter as viewed in a direction away from the annular lower surface 9 of the upper casing base portion 10, as well as a cylindrical portion 36 which is connected at its upper end portion 34 to a lower end portion 35 of the cross-sectionally trapezoidal cylindrical portion 33. An annular end face 37 of the cylindrical portion 36 is located lower than the annular end face 28 of the thin-walled cylindrical portion 23 of the inner peripheral-side cylindrical suspended portion 12 in the axial direction Y.

As particularly shown in detail in FIGS. 9 to 16, the lower casing 3 integrally includes an annular lower casing base portion 39 having an annular upper surface 38; an annular protrusion 40 protruding from the annular upper surface 38 of the lower casing base portion 39 upwardly in the axial direction Y; a hollow cylindrical portion 43 disposed at an inner peripheral portion 42 of an annular lower surface 41 of the lower casing base portion 39 in such a manner as to protrude from the annular lower surface 41 downwardly in the axial direction Y; an annular protruding portion 46 protruding inwardly in the radial direction X from a cylindrical inner peripheral surface 45 of the hollow cylindrical portion 43 at an end portion 44 of the hollow cylindrical portion 43; an annular protruding portion 47 protruding from the end portion 44 of the hollow cylindrical portion 43 downwardly in the axial direction Y; and a plurality of curved projecting portions 50 which project from an outer peripheral edge portion of an annular upper surface 48 of the annular protrusion 40 upwardly in the axial direction Y by leaving an annular flat portion 49 and are provided uprightly in such a manner as to be spaced apart from each other in the circumferential direction R about the axis O.

The annular protrusion 40 includes a cylindrical outer peripheral surface 51 connected to the annular flat portion 49 of its annular upper surface 48, an annular stepped surface 52 connected to the outer peripheral surface 51, an outer peripheral cylindrical surface 53 connected to the stepped surface 52 and extending downwardly in the axial direction Y beyond the annular upper surface 38, and an annular projecting surface 55 located outwardly in the radial direction X of a lower end portion 54 of the outer peripheral cylindrical surface 53. The annular projecting surface 55 on one side is connected to the lower end portion 54 of the outer peripheral cylindrical surface 53 through an annular upper surface 56 and a circular arc-shaped recessed surface 57, and the annular projecting surface 55 on the other side is connected to the annular lower surface 41 through an annular tapered surface 55a.

A plurality of protrusions 58, which are rectangular in a plan view, are integrally formed on the outer peripheral surface 51 of the annular protrusion 40 along the circumferential direction R, and the protrusions 58 extend from the annular stepped surface 52 upwardly in the axial direction Y. An upper end surface 59 of each protrusion 58 is connected to the annular flat portion 49 of the annular upper surface 48 through the outer peripheral surface 51, and an outer surface 60 of each protrusion 58 is formed to be smaller in diameter than the outside diameter of the outer peripheral cylindrical surface 53.

The annular protrusion 40 has, on an inner peripheral surface 62 connected to its annular upper surface 48, a reduced-diameter cylindrical portion 64 which is reduced in diameter through an annular stepped surface 63 and has an inner peripheral surface 64a. The annular upper surface 38 is connected to the cylindrical inner peripheral surface 45 of the cylindrical portion 43 through an annular notched stepped surface 65.

A plurality of protrusions 66, which are rectangular in a plan view, are integrally formed on the inner peripheral surface 64a of the reduced-diameter cylindrical portion 64 of the annular protrusion 40 along the circumferential direction R, and the protrusions 66 extend from the annular upper surface 38 upwardly in the axial direction Y. An upper end surface 67 of each protrusion 66 is connected to the inner peripheral surface 62 through the inner peripheral surface 64a of the reduced-diameter cylindrical portion 64 and the annular stepped surface 63.

A plurality of hole portions 68 are formed in the annular upper surface 48 of the annular protrusion 40 along the circumferential direction R in such a manner as to extend downwardly in the axial direction Y. Each hole portion 68 has a truncated conical shape which is tapered from its circular opening portion 69 to a bottom surface 70 defining that hole portion 68, and an inner surface 71 defining the hole portion 68 has a truncated conical surface. These hole portions 68 are provided so as to reduce as practically as possible such trouble as the occurrence of sink marks during molding by making uniform the thickness of the annular protrusion 40 of the lower casing 3 and the thickness of other portions thereof.

On the annular protrusion 40, the following are formed at a rim of a circular opening portion 69a of each hole portion 68a, among the plurality of hole portions 68, which is formed on that portion of the annular upper surface 48 which is located at a discontinuous portion 72 between adjacent ones of the curved projecting portions 50 provided uprightly on the outer peripheral edge portion of the annular upper surface 48 along the circumferential direction R: a pair of semicircular recessed portions 73 which oppose each other in the circumferential direction R in such a manner as to surround the circular opening portion 69a and are shallow in depth; a pair of radially inner recessed portions 74 which are continuous from the respective semicircular recessed portions 73 on an inner side in the radial direction X, are open at the inner peripheral surface 62, have the same depth as the semicircular recessed portions 73, and oppose each other in the circumferential direction R; a pair of radially outer recessed portions 77 which are continuous from the respective semicircular recessed portions 73 on an outer side in the radial direction X, are closed on the outer side in the radial direction X by a closing portion 76 of the annular protrusion 40, have the same depth as the semicircular recessed portions 73, and oppose each other in the circumferential direction R; and an outer peripheral-side recessed groove 79 which is located on a lower side in the axial direction Y than bottom surfaces 78 of the semicircular recessed portions 73, the radially inner recessed portions 74, and the radially outer recessed portions 77, penetrates an intermediate portion of the protrusion 58, is open at the outer surface 60 of the protrusion 58 on an outer side in the radial direction X, and communicates with the hole portion 68a on an inner side in the radial direction X. The recessed groove 79 is defined by a bottom surface 80 located on a lower side in the axial direction Y than the bottom surface 78 and by a pair of wall surfaces 81 opposing each other in the circumferential direction R; each of the wall surfaces 81 has an inner peripheral-side end edge 82 and an outer peripheral-side end edge 83, in which the inner peripheral-side end edge 82 is connected to the inner surface 71 defining the hole portion 68a, and the outer peripheral-side end edge 83 is connected to the outer surface 60.

On the annular protrusion 40, the following are further formed at the rim of the circular opening portion 69a of the hole portion 68a: a notched recessed groove 83a which is located on a lower side in the axial direction Y than the bottom surfaces 78 of the radially inner recessed portions 74 and is notched in such a manner as to extend from the hole portion 68a side inwardly in the radial direction X; an open groove 83b which is defined by a bottom surface 88 connected through a stepped surface 87 to a bottom surface 86 defining the notched recessed groove 83a, and is open at an inner surface 89 of the protrusion 66; and a pair of notched grooves 84 which communicate with the open groove 83b by their side surfaces in the circumferential direction R, are open at the inner peripheral surface 62 on an inner side in the radial direction X, are each defined by an inclined surface 94 on an outer side in the radial direction X and by the annular stepped surface 63 on a lower side in the axial direction Y, and oppose each other in the circumferential direction R, the notched recessed groove 83a communicating with the hole portion 68a on the outer side in the radial direction X.

Each of a pair of wall surfaces 92 of the annular protrusion 40, which define the notched recessed groove 83a and the open groove 83b and oppose each other in the circumferential direction R, has an inner peripheral-side end edge 93 and an outer peripheral-side end edge 95, the inner peripheral-side end edge 93 being connected to an inclined surface 94 defining the notched groove 84, the outer peripheral-side end edge 95 being connected to the inner surface 71 defining the hole portion 68a, and the inclined surface 94 being inclined in such a manner as to enlarge the width of the notched groove 84 in the radial direction X, as viewed in an upward direction in the axial direction Y.

Thus, the annular protrusion 40 has the recessed groove 79 which is open at its outer end in the radial direction X to the outer side in the radial direction X at the outer surface 60, is open at its inner other end in the radial direction X to the hole portion 68a, and is open upwardly in the axial direction V from the outer end in the radial direction X to the inner other end in the radial direction X, as well as an inner peripheral-side recessed groove 83c which is constituted by the notched recessed groove 83a and the open groove 83b which communicate with each other, and is open at the outer end in the radial direction X to the hole portion 68a, is open at the inner other end in the radial direction X to the inner side in the radial direction X at the inner surface 89, and is open upwardly in the axial direction Y in a range from the outer side in the radial direction X to the inner other end in the radial direction X.

As particularly shown in detail in FIGS. 17 to 21, the synthetic resin-made sliding bearing piece 5 disposed in the annular space 4 includes an annular thrust sliding bearing piece portion 99 having an annular upper surface 97 which is brought into slidable contact with the annular lower surface 9 of the upper casing base portion 10 and an annular lower surface 98 which is brought into contact with the annular upper surface 48 of the annular protrusion 40 of the lower casing base portion 39; a cylindrical radial sliding bearing piece portion 102 which is integrally formed at its annular one end portion on the annular one end portion of the thrust sliding bearing piece portion 99 in such a manner as to extend downwardly in the axial direction Y and has an annular inner side surface 100 which is brought into slidable contact with the outer peripheral surface 27 of the thick-walled cylindrical portion 18 of the inner peripheral-side cylindrical suspended portion 12 of the upper casing base portion 10 and an annular outer side surface 101 which is brought into contact with the inner peripheral surface 62 of the annular protrusion 40 of the lower casing base portion 39; and a plurality of radial projecting plate piece portions 104 which project outwardly from an outer peripheral surface 103 of the thrust sliding bearing piece portion 99, and which are respectively arranged at the discontinuous portions 72, each located between adjacent ones of the curved projecting portions 50 provided uprightly on the outer peripheral edge portion of the annular upper surface 48 of the annular protrusion 40 of the lower casing base portion 39 along the circumferential direction R, and are clamped by the adjacent ones of the projecting portions 50 so that the sliding bearing piece 5 does not rotate in the circumferential direction R with respect to the lower casing 3.

The thrust sliding bearing piece portion 99 has an annular groove 105 provided on an inner peripheral side of the annular upper surface 97 and a plurality of radial grooves 106 which are open at their one ends to the annular groove 105 and are open at their other ends to the outer peripheral surface 103, and which are provided on the upper surface 97 by being spaced apart at equal intervals in the circumferential direction R. The radial sliding bearing piece portion 102 has a plurality of axial grooves 107 which are open at their both ends and are provided on the annular inner side surface 100 by being spaced apart at equal intervals in the circumferential direction R. The annular groove 105, the radial grooves 106, and the axial grooves 107 serve as a sump section for lubricating oil such as grease.

As shown particularly in detail in FIGS. 4 and 5 and FIGS. 22 to 30, the seal member 8 has a flexible inner peripheral-side annular seal portion 110 which is elastically brought into flexural contact with the truncated conical outer peripheral surface 29 of the thin-walled cylindrical portion 23 of the inner peripheral-side cylindrical suspended portion 12, so as to seal the gap 6 between the thin-walled cylindrical portion 23, i.e., an axial end portion 108 of the inner peripheral-side cylindrical suspended portion 12 of the upper casing base portion 10, and an inner peripheral end portion 109 of the lower casing base portion 39; a flexible outer peripheral-side annular seal portion 113 which is elastically brought into flexural contact with the inner peripheral surface 32 of the cross-sectionally trapezoidal cylindrical portion 33 of the outer peripheral-side cylindrical suspended portion 14, so as to seal the gap 7 between an axial end portion 111 of the outer peripheral-side cylindrical suspended portion 14 of the upper casing base portion 10 and an outer peripheral end portion 112 of the lower casing base portion 39; and a plurality of connecting portions 115 for connecting to each other the inner peripheral-side annular seal portion 110 arranged on the inner peripheral side and the outer peripheral-side annular seal portion 113 arranged on the outer peripheral side.

The inner peripheral-side annular seal portion 110 includes an annular inner peripheral seal base portion 116 which is integrally joined to the reduced-diameter cylindrical portion 64 of the annular protrusion 40 projecting from the annular upper surface 38 of the lower casing base portion 39 upwardly in the axial direction X, in such a manner as to cover outer surfaces of the plurality of protrusions 66 which are rectangular in a plan view and are integrally formed on the reduced-diameter cylindrical portion 64, as well as an annular flexible inner peripheral seal portion 117 which is connected to the inner peripheral seal base portion 116 and is elastically brought into contact with the truncated conical outer peripheral surface 29 of the thin-walled cylindrical portion 23 of the inner peripheral-side cylindrical suspended portion 12.

The inner peripheral seal portion 117 extends diagonally downwardly, i.e., inwardly in the radial direction X, from an inner peripheral end portion 118 of the inner peripheral seal base portion 116, and has a smaller thickness than the thickness of the inner peripheral seal base portion 116.

The outer peripheral-side annular seal portion 113 includes an annular outer peripheral seal base portion 119 which is integrally joined to the outer peripheral surface 51 of the annular protrusion 40 projecting from the annular upper surface 38 of the lower casing base portion 39 upwardly in the axial direction X, in such a manner as to cover the outer peripheral surface 51, the upper end face 59 of the protrusion 58, the outer surface 60 of the protrusion 58, and the inner peripheral side of the stepped surface 52, as well as an annular outer peripheral seal portion 120 which is connected to the outer peripheral seal base portion 119 and is elastically brought into flexural contact with the inner peripheral surface 32 of the cross-sectionally trapezoidal cylindrical portion 33 of the outer peripheral-side cylindrical suspended portion 14.

The outer peripheral seal portion 120 extends diagonally downwardly, i.e., outwardly in the radial direction X, from an inner peripheral end portion 121 of the outer peripheral seal base portion 119, and has a smaller thickness than the thickness of the outer peripheral seal base portion 119.

The outer peripheral seal portion 120 may be adapted to cover the annular flat portion 49 as well.

Each of the connecting portions 115 includes a columnar portion 115a filled in the hole portion 68a formed in the annular upper surface 48 located at the discontinuous portion 72; an outer connecting portion 115b whose inner side in the radial direction X is formed integrally with the columnar portion 115a, whose outer side in the radial direction X is formed integrally with the outer peripheral seal base portion 119, and which is disposed in the recessed groove 79; and an inner connecting portion 115c whose outer side in the radial direction X is formed integrally with the columnar portion 115a, whose inner side in the radial direction X is formed integrally with the inner peripheral seal base portion 116, and which is disposed in the recessed groove 83c constituted by the notched recessed groove 83a and the open groove 83b. The columnar portion 115a is joined to the bottom surface 70 and the inner surface 71 in such a manner as to cover the bottom surface 70 and the inner surface 71, the outer connecting portion 115b is joined to the wall surfaces 81 and the bottom surface 80 in such a manner as to cover the mutually opposing pair of wall surfaces 81 and the bottom surface 80 defining the recessed groove 79 on the annular protrusion 40, and the inner connecting portion 115c is joined to the bottom surface 86, the bottom surface 88, and the wall surface 92 in such a manner as to cover the bottom surface 86, the bottom surface 88, and the wall surface 92.

The inner peripheral-side annular seal portion 110 and the outer peripheral-side annular seal portion 113 are insert molded on the annular protrusion 40 of the lower casing base portion 39 together with the connecting portions 115 having the columnar portions 115a, so that each of the plurality of connecting portions 115 is integrally connected at the inner connecting portion 115c, i.e., one end portion, to the inner peripheral-side annular seal portion 110, and at the outer connecting portion 115b, i.e., the other end portion, to the outer peripheral-side annular seal portion 113 by insert molding.

The above-described sliding bearing 1 is adapted to allow the relative rotation in the circumferential direction R of the lower casing 3 with respect to the upper casing 2 by the relative sliding in the circumferential direction R of each of the upper surface 97 of the thrust sliding bearing piece portion 99 with respect to the annular lower surface 9 of the upper casing base portion 10 and the inner side surface 100 of the radial sliding bearing piece portion 102 with respect to the outer peripheral surface 27 of the thick-walled cylindrical portion 18.

According to the above-described sliding bearing 1, since each of the plurality of connecting portions 115 is integrally connected at its one end portion to the inner peripheral-side annular seal portion 110 and at its other end portion to the outer peripheral-side annular seal portion 113, respectively, by insert molding, the number of parts can be reduced, and the assembling efficiency excels, making it possible to attain a reduction in the manufacturing cost. Moreover, the durability can be improved by eliminating the possibility of coming off.

In addition, according to the sliding bearing 1, the sealability can be improved since the seal member 8 has the inner peripheral-side annular seal portion 110 for sealing the gap 6 between the inner peripheral-side cylindrical suspended portion 12 of the upper casing 2 and the inner peripheral end portion 109 of the lower casing 3 and the outer peripheral-side annular seal portion 113 for sealing the gap 7 between the outer peripheral-side cylindrical suspended portion 14 of the upper casing 2 and the outer peripheral end portion 112 of the lower casing 3.

Incidentally, as shown in FIGS. 31 to 36, in the synthetic resin-made sliding bearing piece 5 including: the annular thrust sliding bearing piece portion 99 having the annular upper surface 97 which is brought into slidable contact with the annular lower surface 9 of the upper casing base portion 10 and the annular lower surface 98 which is brought into contact with the annular upper surface 48 of the annular protrusion 40 of the lower casing base portion 39; the cylindrical radial sliding bearing piece portion 102 which is integrally formed at its one end portion on the one end portion of the thrust sliding bearing piece portion 99 in such a manner as to extend downwardly in the axial direction Y and has the annular inner side surface 100 which is brought into slidable contact with the outer peripheral surface 27 of the thick-walled cylindrical portion 18 of the upper casing 2 and the annular outer side surface 101 which is brought into contact with the inner peripheral surface 62 of the annular protrusion 40 of the lower casing base portion 39; and the plurality of radial projecting plate piece portions 104 which project outwardly from the outer peripheral surface 103 of the thrust sliding bearing piece portion 99, and which are respectively arranged at the discontinuous portions 72, each located between adjacent ones of the curved projecting portions 50 provided uprightly on the outer peripheral edge portion of the annular upper surface 48 of the annular protrusion 40 of the lower casing base portion 39 along the circumferential direction R, and are clamped by the adjacent ones of the projecting portions 50 so that the sliding bearing piece 5 does not rotate in the circumferential direction R with respect to the lower casing 3, the thrust sliding bearing piece portion 99 may have pluralities of inner recessed portions 122 and outer recessed portions 123 which are formed in the annular upper surface 97 along the circumferential direction R and in at least two rows including an inner row and an outer row in the radial direction.

Each of the inner recessed portions 122 formed as the inner row is defined by an inner circular arc-shaped surface 124 having the axis O as the center, an outer circular arc-shaped surface 125 with its diameter enlarged in the radial direction, and a pair of circular arc-shaped surfaces 126 connecting the respective opposite ends of the inner circular arc-shaped surface 124 and the outer circular arc-shaped surface 125.

Each of the outer recessed portions 123 formed as the outer row is defined by an inner circular arc-shaped surface 127 having the axis O as the center, an outer circular arc-shaped surface 128 with its diameter enlarged in the radial direction, and a pair of circular arc-shaped surfaces 129 connecting the inner circular arc-shaped surface 127 and the outer circular arc-shaped surface 128. Each outer recessed portion 123 is arranged at a position corresponding to a discontinuous portion 130 in the circumferential direction R between adjacent ones of the inner recessed portions 122 formed as the inner row.

Small circular portions 130a which are arranged at intervals of 60° along the circumferential direction R indicate positions of projecting pins used at the time of the molding of the sliding bearing 1, and are not arranged in the inner recessed portions 122.

The radial sliding bearing piece portion 102 shown in FIGS. 31 to 36 may also have the plurality of axial grooves 107 which are open at their both ends in the axial direction Y and are provided on the annular inner side surface 100 by being spaced apart at equal intervals in the circumferential direction R.

The pluralities of inner recessed portions 122 and outer recessed portions 123, which are arranged in the annular upper surface 97 of the thrust sliding bearing piece portion 99 along the circumferential direction R and in at least two rows including the inner row and the outer row in the radial direction, as well as the axial grooves 107 serve as a sump section for lubricating oil such as grease.

According to the sliding bearing 1 having the sliding bearing piece 5 shown in FIGS. 31 to 36, the sealability can be improved since the seal member 8 has the inner peripheral-side annular seal portion 110 for sealing the gap 6 between the inner peripheral-side cylindrical suspended portion 12 of the upper casing 2 and the inner peripheral end portion 109 of the lower casing 3 and the outer peripheral-side annular seal portion 113 for sealing the gap 7 between the outer peripheral-side cylindrical suspended portion 14 of the upper casing 2 and the outer peripheral end portion 112 of the lower casing 3. In addition, an increase in the steering force can be prevented since the lubricating oil such as grease filled in the inner recessed portions 122 and the outer recessed portions 123 is constantly present in the sliding direction between the annular lower surface 9 of the upper casing base portion 10 and the upper surface 97 of the thrust sliding bearing piece portion 99.

Figure 37:
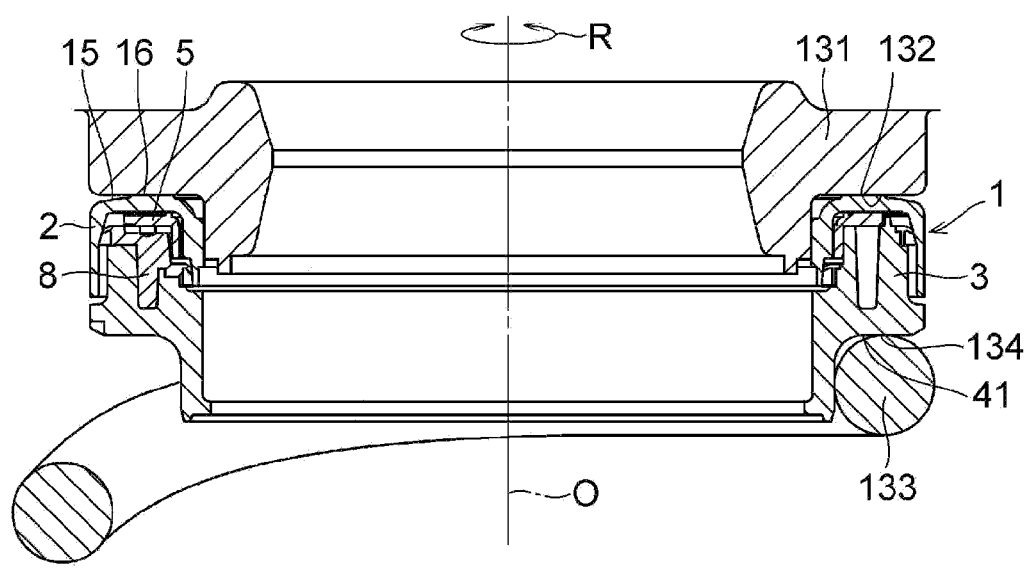
FIG. 37 is an explanatory cross-sectional view in which the sliding bearing shown in FIG. 1 is incorporated in a strut-type suspension.

As shown in FIG. 37, for example, the synthetic resin-made sliding bearing 1 in accordance with this embodiment may be applied to a strut-type suspension in a four-wheeled motor vehicle by disposing the synthetic resin-made sliding bearing 1 in accordance with this embodiment between a vehicle body-side bearing surface 132 of a vehicle body-side mounting member 131 and a suspension coil spring 133 such that the annular seat portion 16 of the annular upper surface 15 of the upper casing 2 of the sliding bearing 1 is abutted against the vehicle body-side bearing surface 132 of the vehicle body-side mounting member 131, and such that the annular lower surface 41 of the lower casing 3 as a spring bearing surface 134 of the sliding bearing 1 is abutted against an upper end portion of the suspension coil spring 133.

In the strut-type suspension shown in FIG. 37, the relative rotation in the circumferential direction R of the suspension coil spring 133 with respect to the vehicle body-side mounting member 131 is allowed by the relative sliding in the circumferential direction R of each of the upper surface 97 of the thrust sliding bearing piece portion 99 with respect to the annular lower surface 9 of the upper casing base portion 10 of the sliding bearing 1 and the inner side surface 100 of the radial sliding bearing piece portion 102 with respect to the outer peripheral surface 27 of the thick-walled cylindrical portion 18.

The invention claimed is:

1. A synthetic resin-made thrust sliding bearing comprising: a synthetic resin-made upper casing; a synthetic resin-made lower casing superposed on said upper casing so as to be rotatable about an axis relative to said upper casing; a synthetic resin-made sliding bearing piece disposed between the upper casing and the lower casing; and a synthetic resin-made seal member integrally having a flexible inner peripheral-side annular seal portion for sealing a gap between radially inner peripheral sides of said upper casing and said lower casing, a flexible outer peripheral-side annular seal portion for sealing a gap between radially outer peripheral sides of said upper casing and said lower casing, and a connecting portion disposed in a recessed groove of the lower casing for connecting the inner peripheral-side annular seal portion and the outer peripheral-side annular seal portion to each other.

2. The synthetic resin-made sliding bearing according to claim 1, wherein the connecting portion integrally has a columnar portion disposed in a hole portion of the lower casing.

3. A synthetic resin-made sliding bearing comprising:
a synthetic resin-made upper casing; a synthetic resin-made lower casing superposed on said upper casing so as to be rotatable about an axis relative to said upper casing; a synthetic resin-made sliding bearing piece disposed between the upper casing and the lower casing; and a synthetic resin-made seal member integrally having a flexible inner peripheral-side annular seal portion for sealing a gap between radially inner peripheral sides of said upper casing and said lower casing, a flexible outer peripheral-side annular seal portion for sealing a gap between radially outer peripheral sides of said upper casing and said lower casing, and a plurality of connecting portions respectively disposed in a plurality of recessed grooves of the lower casing for connecting the inner peripheral-side annular seal portion and the outer peripheral-side annular seal portion to each other.

4. The synthetic resin-made sliding bearing according to claim 3, wherein the connecting portion integrally has a columnar portion disposed in a hole portion of the lower casing.

* * * * *